(12) United States Patent
Takanashi et al.

(10) Patent No.: US 6,351,399 B2
(45) Date of Patent: Feb. 26, 2002

(54) POWER CONVERTER

(75) Inventors: Ken Takanashi; Shinji Hatae, both of Tokyo; Kazuaki Hiyama; Khalid Hassan Hussein, both of Fukuoka; Fumitaka Tametani, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,053

(22) Filed: Feb. 28, 2001

Related U.S. Application Data

(63) Continuation of application No. PCT/JP99/03456, filed on Jun. 29, 1999.

(51) Int. Cl.[7] .............................................. H02H 7/122
(52) U.S. Cl. ................................................... 363/56.05
(58) Field of Search ........................... 363/56.05, 56.02, 363/70, 71, 132

(56) References Cited

U.S. PATENT DOCUMENTS 5,793,623 A * 8/1998 Kawashima .................. 363/36

FOREIGN PATENT DOCUMENTS

| JP | 08-308253 | 11/1996 |
|---|---|---|
| JP | 09-219976 | 8/1997 |
| JP | 10-094269 | 4/1998 |
| JP | 2 324 664 A | 10/1998 |
| JP | 11-27931 | 1/1999 |

* cited by examiner

Primary Examiner—Shawn Riley
(74) Attorney, Agent, or Firm—Oblon, Spivak, McClelland, Maier & Neustadt, P.C.

(57) ABSTRACT

To prevent malfunction or breakdown due to a surge voltage in a power converter for converting DC into AC or the like so as to supply electric power to a load, not only a control signal is transmitted via a level shift circuit which is provided correspondingly to each of switching semiconductor elements forming a main circuit and shifts a level of a reference potential at its output side so as to follow variations of a reference potential of the switching semiconductor element to the switching semiconductor element, but a DC control power source for supplying electric power to the level shift circuit and a negative pole of the switching semiconductor element are connected to each other through at least one of an inductor and a resistance.

24 Claims, 10 Drawing Sheets

POWER CONVERTER

CROSS-REFERENCE TO A RELATED APPLICATION

This application is a continuation application of PCT international application No. PCT/JP99/03456 filed on Jun. 29, 1999, the entire contents of which are incorporated by reference.

International application No. PCT/JP99/03456 was not published in English.

BACKGROUND OF THE INVENTION

1. Field of the Invention

The present invention relates to a power converter including a plurality of semiconductor element rows each having a plurality of semiconductor elements connected to one another in series. The semiconductor element rows are connected to one another in parallel and at least one of the semiconductor elements in each semiconductor element row is a switching semiconductor element. More particularly, the present invention relates to an improvement of the switching semiconductor element.

2. Discussion of the Background

In recent years, semiconductor power modules in each of which a main circuit including switching semiconductor elements and a drive control circuit for controlling drive of the switching semiconductor elements of the main circuit are stored in a package as a power converter have been frequently used as a drive unit for controlling drive of an induction motor, a DC brushless motor, a switched reluctance (SR) motor, etc.

FIG. 11 is a circuit block diagram of an inverter for driving, as a background power converter, an induction motor which is a three-phase AC load. In FIG. 11, each of the reference numerals "1U", "1V" and "1W" denotes an insulated-gate bipolar transistor (hereinafter, referred to as an "IGBT") acting as a high-side switching semiconductor element in a semiconductor element row formed by a pair of switching semiconductor elements connected to each other in series. Further, each of the reference numerals "2U", "2V" and "2W" denotes an IGBT acting as a low-side switching semiconductor element connected to each of the IGBTs 1U, 1V and 1W in series. Reference numerals "3U", "3V" and "3W" denote flywheel diodes, which are respectively connected to the IGBTs 1U, 1V and 1W in parallel, while reference numerals "4U", "4V" and "4W" denote flywheel diodes, which are respectively connected to the IGBTs 2U, 2V and 2W in parallel.

A U-phase semiconductor element row is formed by the IGBTs 1U and 2U and the flywheel diodes 3U and 4U and a V-phase semiconductor element row is formed by the IGBTs 1V and 2V and the flywheel diodes 3V and 4V. Meanwhile, a W-phase semiconductor element row is formed by the IGBTs 1W and 2W and the flywheel diodes 3W and 4W. In addition, connecting opposite end portions of these semiconductor element rows to one another, respectively, an inverter bridge is formed in which the U-phase, V-phase and W-phase semiconductor element rows are connected to one another in parallel.

Meanwhile, a main circuit 5 is formed in which in the U-phase, V-phase and W-phase semiconductor element rows connected to one another in parallel, a junction of collectors C of the IGBTs 1U, 1V and 1W is set as a high-potential input terminal P and a junction of emitters E of the IGBTs 2U, 2V and 2W is set as a low-potential input terminal N such that a series junction of the IGBTs 1U and 2U, a series junction of the IGBTs 1V and 2V and a series junction of the IGBTs 1W and 2W are respectively set as output terminals U, V and W.

Further, a DC main power source 6 is connected in parallel to a smoothing capacitor 7 such that a positive pole and a negative pole of the DC main power source 6 are respectively connected to the input terminal P and the input terminal N. A three-phase induction motor 8 acting as a load of the main circuit 5 is also connected to the output terminals U, V and W. Meanwhile, each of characters "Lu", "Lv" and "Lw" denotes a parasitic inductance in a line connecting an emitter E of each of the IGBTs 2U, 2V and 2W and the input terminal N.

A DC control power source 9 supplies electric power to input circuit sections of drive control circuits 10U, 10V and 10W provided for the IGBTs 2U, 2V and 2W, respectively. An amplifier 11 forms the input circuit section of the drive control circuit 10U so as to amplify and output a control signal input from an input terminal INu. A photocoupler 12 is formed by a light emitting diode LED and a phototransistor PT. An input signal output from the amplifier 11 is input to the light emitting diode LED via a protective resistance 13 and is output through its insulation, as an insulation signal, from the phototransistor PT. Namely, the photocoupler 12 employs a collector C of the phototransistor PT, which is connected to a load resistance 14, as an output terminal for the insulation signal.

Further, a drive circuit 15 forms an output circuit section of the drive control circuit 10U and receives and amplifies the insulation signal output from the photocoupler 12 so as to output a drive voltage signal to a gate G of the IGBT 2U via a gate resistance 16. A DC drive power source 17U for supplying electric power to the output circuit section of the drive control circuit 10U supplies electric power not only to the phototransistor PT by way of the load resistance 14, but also to the drive circuit 15.

As described above, the drive control circuit 10U for controlling a drive of the IGBT 2U in response to an input of the control signal from the input terminal INu is formed by the amplifier 11, the photocoupler 12, the protective resistance 13, the load resistance 14, the drive circuit 15 and the load resistance 16. In addition, the drive control circuit 10V for controlling a drive of the IGBT 2V in response to an input of a control signal from an input terminal Inv, and the drive control circuit 10W for controlling a drive of the IGBT 2W in response to an input of a control signal from an input terminal INw each have a similar arrangement. The single DC control power source 9 is provided in common as a drive power source of the input circuit sections of the drive control circuits 10U, 10V and 10W. However, the DC drive power sources 17U, 17V and 17W are respectively inserted into the output circuit sections of the drive control circuits 10U, 10V and 10W as their drive power sources.

The operation of the background inverter shown in FIG. 11 will now be described. Initially, a pulse width modulation (PWM) control circuit (not shown) is provided for outputting PWM signals for performing a variable speed control of the three-phase induction motor 8 acting as the load. Further, the PWM signals (i.e., the control signals of the PWM control circuit) are respectively input to the input terminals INu, INv and INw of the drive control circuits 10U, 10V and 10W. The control signal input to the drive control circuit 10U is amplified by the amplifier 11 and is input to the light emitting diode LED of the photocoupler 12 through the protective resistance 13 so as to be output through its insulation, as the insulation signal, from the phototransistor PT. The insulation signal output from the collector C of the phototransistor PT, which is connected to the load resistance 14, is amplified by the drive circuit 15 and is input, as the drive voltage signal, to the gate G of the low-side IGBT 2U so as to perform on-off drive of the IGBT 2U. The drive control circuits 10V and 10W are also operated similarly so as to perform on-off drive of the IGBTs 2V and 2W, respectively. Likewise, the high-side IGBTs 1U, 1V and 1W are also subjected to on-off drive by corresponding drive control circuits (not shown) respectively such that a variable speed control of the three-phase induction motor 8 is performed by PWM control.

In addition, the background inverter shown in FIG. 11 is arranged and operated as described above. Negative poles of the output circuit sections of the drive control circuits 10U, 10V and 10W should essentially have an identical potential and may be operated by a single power source. However, variations of reference potentials of the IGBTs 2U, 2V and 2W may be caused by generating an induced voltage such as a surge voltage upon opening or closing of the IGBTs 2U, 2V and 2W due to the parasitic inductances Lu, Lv and Lw in the lines connecting the emitters E of the IGBTs 2U, 2V and 2W and the input terminal N, respectively, thereby resulting in malfunction or breakdown of the circuit.

To prevent the above malfunction of the circuit, it is necessary to provide level shift circuits in which levels of reference potentials of the drive voltage signals can be shifted from reference potentials of the PWM control circuit so as to follow up the reference potentials of the IGBTs 2U, 2V and 2W, respectively. In addition, the control signals (PWM signals) output from the PWM control circuit are converted into the drive voltage signals in a floating state so as to be input to the gates G of the IGBTs 2U, 2V and 2W. In the above mentioned background art, the photocoupler 12 is inserted, as the level shift circuit, into each of the drive control circuits 10U, 10V and 10W. Further, the DC drive power sources 17U, 17V and 17W are independently provided for the respective phases at the output circuit sections of the drive control circuits 10U, 10V and 10W.

The photocoupler 12 formed by the light emitting diode LED and the phototransistor PT is completely insulated between its input and its output and functions as the level shift circuit quite excellently. However, the photocoupler 12 has such drawbacks that its service life is limited and is not only larger in volume but more expensive than other semiconductor elements. Meanwhile, since the DC drive power sources 17U, 17V and 17W are required to be provided independently for the respective phases, such problems arise that the device becomes expensive and it is difficult to make the device compact.

Furthermore, an arrangement is known which includes a protective circuit (not shown) having a function of detecting an abnormality of a power source voltage, etc. supplied from outside to prevent a breakdown of the respective IGBTs of the above circuit. However, an arrangement does not exist which has a function of protecting deterioration of the IGBTs by self-diagnosis.

Meanwhile, to prevent breakdown of the respective IGBTs of the above circuit due to a surge voltage between the gate G and the emitter E of each IGBT, a self-protection circuit (not shown) is provided in which a pair of Zener diodes reversely connected to each other in series are inserted between the gate G and the emitter E. Namely, a surge voltage generated between a collector C and the emitter E is divided by parasitic capacities between the collector C and the gate G and between the gate G and the emitter E so as to be applied between the gate G and the emitter E. If this applied voltage exceeds a withstand voltage of the gate G, the respective IGBT breaks down. Thus, to protect each IGBT from the surge voltage, a pair of the Zener diodes reversely connected to each other in series are inserted between the gate G and the emitter E so as to restrict the voltage generated between the gate G and the emitter E to not more than a breakdown voltage of the Zener diodes. However, since a dynamic resistance of the Zener diodes is large, the Zener voltage becomes transitionally larger than its rated value at the time of generation of the surge voltage, so that it has been impossible to sufficiently restrain overvoltage caused by the surge voltage generated between the gate G and the emitter E.

Meanwhile, to obtain a signal insulated from an output line, a non-contact type current detecting element (not shown) such as a Hall element, a current transformer or the like is generally used in a background current detecting device (not shown) incorporated in the switching semiconductor element. However, in case the non-contact type current detecting element referred to above is used, such drawbacks are incurred that it is difficult to make the current detecting element compact and its detection accuracy is low due to the non-contact type.

SUMMARY OF THE INVENTION

Accordingly, one object of the present invention is to solve the above-noted and other problems.

Another object of the present invention is to provide a highly reliable power converter in which switching semiconductor elements forming a main circuit and their drive circuits are free from malfunction and breakdown.

To achieve these and other objects, the present invention provides in a first example a power converter including a main circuit having a plurality of semiconductor element rows, each having a plurality of semiconductor elements connected to one another in series. Also included is a DC main power source connected between junctions of the semiconductor element rows and a load connected to a series junction of the semiconductor elements in each of the semiconductor element rows.

Further, the semiconductor element rows are connected, at opposite ends of each of the semiconductor element rows, to one another in parallel and at least one of the semiconductor elements in each of the semiconductor element rows is a switching semiconductor element. Further provided is a level shift circuit to the switching semiconductor element and which receives a control signal at its input side and shifts, relative to a reference potential at the input side, a level of a reference potential at its output side so as to follow up variations of a reference potential of the switching semiconductor element. Also included is a drive circuit which receives a signal from the level shift circuit so as to output a drive signal to the switching semiconductor element, and a DC control power source for supplying electric power to the input side of the level shift circuit. In addition, electric power supplied from the DC main power source is converted into an alternating current or an on/off current in response to input of the control signal so as to be supplied to the load.

Further, the level shift circuit includes a transistor having a negative pole not only connected to a negative pole of the DC control power source but having the reference potential connected at the input side of the level shift circuit, a gate for receiving the control signal, and a positive pole for outputting, by shifting a level of a reference potential of the control signal input to the gate, the control signal to the drive circuit.

In addition, a point of the main circuit is connected to a negative pole of the DC main power source; and one of (1) at least one of an inductor and a resistance, which is inserted between the point of the main circuit and the negative pole of the DC control power source;

(2) a capacitor which is inserted between the negative pole of the DC control power source and a reference potential point of the output side of the level shift circuit;

(3) at least one of a resistance and an inductor, which is inserted between a reference potential point of the output side of the level shift circuit and a negative main pole of the switching semiconductor element corresponding to the level shift circuit;

(4) at least one of an inductor and a resistance, which is inserted between the point of the main circuit and the negative pole of the DC control power source and a capacitor which is inserted between the negative pole of the DC control power source and a reference potential point of the output side of the level shift circuit;

(5) at least one of an inductor and a resistance, which is inserted between the point of the main circuit and the negative pole of the DC control power source and at least one of an additional resistance and an additional inductor, which is inserted between a reference potential point of the output side of the level shift circuit and a negative main pole of the switching semiconductor element corresponding to the level shift circuit;

(6) a capacitor which is inserted between the negative pole of the DC control power source and a reference potential point of the output side of the level shift circuit and at least one of a resistance and an inductor, which is inserted between a reference potential point of the output side of the level shift circuit and a negative main pole of the switching semiconductor element corresponding to the level shift circuit; and (7) at least one of an inductor and a resistance, which is inserted between the point of the main circuit and the negative pole of the DC control power source, a capacitor which is inserted between the negative pole of the DC control power source and a reference potential point of the output side of the level shift circuit and at least one of an additional resistance and an additional inductor, which is inserted between a reference potential point of the output side of the level shift circuit and a negative main pole of the switching semiconductor element corresponding to the level shift circuit.

Since the transistor is used in the level shift circuit as described above, longer service life, more compactness and lower power consumption can be obtained in comparison with a background level shift circuit employing a photocoupler. In addition, since a surge voltage caused by a parasitic inductance of a line of the main circuit, especially a minus surge voltage leading to a higher potential at its negative pole through potential reversal is cancelled or restrained by inserting the inductor, the resistance or the capacitor into the level shift circuit and the drive circuit, and a breakdown of the transistor and malfunction of the switching semiconductor element can be prevented.

The present invention also provides in a second example a power converter including a main circuit having a plurality of semiconductor element rows each having a plurality of semiconductor elements connected to one another in series. Also included is a DC main power source connected between junctions of the semiconductor element rows and a load connected to a series junction of the semiconductor elements in each of the semiconductor element rows. Further, the semiconductor element rows are connected, at opposite ends of each of the semiconductor element rows, to one another in parallel and at least one of the semiconductor elements in each of the semiconductor element rows is a switching semiconductor element.

Also included is a level shift circuit which is provided correspondingly to the switching semiconductor element and which receives a control signal at its input side and shifts, relative to a reference potential at the input side, a level of a reference potential at its output side so as to follow up variations of a reference potential of the switching semiconductor element. Further included is a drive circuit which receives a signal from the level shift circuit so as to output a drive signal to the switching semiconductor element, and a DC control power source for supplying electric power to the input side of the level shift circuit.

Electric power supplied from the DC main power source is converted into an alternating current or an on/off current in response to an input of the control signal so as to be supplied to the load. In addition, a capacitor is inserted between positive and negative feeding points common with the drive circuit and the output side of the level shift circuit corresponding to a low-side switching semiconductor element of each of the semiconductor element rows, and a diode is inserted between a positive pole of the DC control power source and the positive feeding point such that a cathode of the diode is connected to the capacitor.

In addition, a point of the main circuit is connected to a negative pole of the DC main power source, and at least one of an inductor and a resistance, which is inserted between the point of the main circuit and a negative pole of the DC control power source.

Since a charging circuit formed by the diode and the capacitor is employed as a drive control power source for the output circuit section set in a floating state relative to the input circuit section in the level shift circuit and the drive circuit and electric power is supplied from the DC control power source as described above, effects of a surge voltage produced in a main power source line is less likely to be exerted even in the single power source in the same manner as a case in which an insulated DC drive power source is provided for each phase, thereby resulting in improved noise margin and more compactness.

In a third example, the present invention is directed to a power converter of the first example and includes an additional capacitor which is inserted between positive and negative feeding points common with the drive circuit and the output side of the level shift circuit, and a diode which is inserted between a positive pole of the DC control power source and the positive feeding point such that a cathode of the diode is connected to the capacitor. Further, a point of the main circuit is connected to a negative pole of the DC main power source. Also included is at least one of an inductor and a resistance, which is inserted between the point of the main circuit and the negative pole of the DC control power source.

Since the transistor having an insulated gate is used in the level shift circuit as described above, a longer service life, more compactness and lower power consumption can be obtained in comparison with a background level shift circuit employing a photocoupler. In addition, since a surge voltage caused by a parasitic inductance of a line of the main circuit, especially a minus surge voltage is cancelled or restrained by inserting the inductor, the resistance or the capacitor into the level shift circuit and the drive circuit, a breakdown of the transistor and malfunction of the switching semiconductor element can be prevented.

Furthermore, since a charging circuit formed by the diode and the capacitor is employed as a drive control power source for the output circuit section set in floating state relative to the input circuit section in the level shift circuit and the drive circuit and electric power is supplied from the DC control power source as described above, effects of a surge voltage produced in a main power source line is less likely to be exerted even in the single power source in the same manner as a case in which an insulated DC drive power source is provided for each phase, thereby resulting in improved noise margin and more compactness.

Meanwhile, in a fourth example the present invention is directed to a power converter of the second or third examples, and includes at least one of an additional inductor and an additional resistance, which is inserted between an anode of the diode and the positive pole of the DC control power source so as to form a series circuit with the diode. Also included is an additional capacitor which is inserted between the point of the main circuit and the anode of the diode.

Since a surge voltage produced in the main circuit is not only prevented from entering the input circuit section of the level shift circuit by at least one of the additional inductor and resistance and at least one of the inductor and the resistance, which is inserted between the point of the main circuit and the negative pole of the DC control power source, but is by-passed by the additional capacitor, the diode and the capacitor inserted between the drive circuit and the output side of the level shift circuit, a drive control circuit formed by the level shift circuit and the drive circuit is hardly affected by the surge voltage.

A fifth example of the present invention is directed to a power converter of one of the first to fourth examples (discussed above) in which the switching semiconductor element is an insulated gate type transistor. In this case, the power converter further includes a gate voltage detecting circuit which has a comparison voltage source for outputting a comparison voltage lower than a normal gate voltage of the transistor and higher than an abnormal gate voltage of the transistor, and a comparator for comparing a voltage of the insulated gate with the comparison voltage so as to output an abnormality signal in case the voltage of the insulated gate is lower than the comparison voltage.

Thus, it is possible to perform self-diagnosis on failure and deterioration of the transistor, the drive circuit, etc. Namely, a state in which the voltage of the insulated gate is lower than the comparison voltage when the drive signal has been output represents occurrence of troubles such as (1) a short circuit between the insulated gate and the negative main pole in the transistor, (2) a failure of the drive circuit and (3) a drop of an output voltage of the DC drive power source for supplying electric power to the drive circuit. Upon occurrence of one of these troubles, a disorder detection signal Fo is output such that abnormality of the transistor and the drive circuit can be easily detected highly reliably.

Furthermore, a sixth example of the present invention is directed to a power converter of the fifth example in which there is a time lag between a first time point of input of the control signal to the drive circuit and a second time point of output of a normal signal by the gate voltage detecting circuit. Further, the power converter includes an abnormality signal invalidating circuit which outputs, during a predetermined period from the first time point to a third time point occurring at or after the second time point, the normal signal by invalidating the abnormality signal output by the gate voltage detecting circuit.

Since the time lag for a rise of the gate voltage is produced by a parasitic capacity between the insulated gate and the negative main pole, the disorder detection signal Fo output by the gate voltage detecting circuit even when the transistor or the drive circuit is normal is invalidated such that high reliability free from erroneous automatic protection is obtained.

Meanwhile, a seventh example of the present invention is directed to a power converter of one of the first to sixth examples in which the switching semiconductor element is an insulated gate type transistor. In this example, the power converter further includes a capacitor which is inserted in parallel with the drive circuit of the transistor such that a negative pole of the capacitor is connected to a negative main pole of the transistor, a first diode which is inserted between a junction of a positive feeding point of the drive circuit and the capacitor and the insulated gate such that an anode of the first diode is connected to the insulated gate, and a second diode which is inserted between the insulated gate and the negative main pole such that a cathode of the second diode is connected to the insulated gate.

High reliability is obtained inexpensively such that it is possible to positively prevent a breakdown of the insulated gate and the drive circuit due to a surge voltage applied between a positive main pole and the negative main pole of the transistor, especially a minus surge voltage leading to higher potential at its negative pole through potential reversal.

An eighth example of the present invention is directed to a power converter of one of the first to sixth examples in which the switching semiconductor element is an insulated-gate transistor having a current detecting terminal provided in parallel with a negative main pole of the transistor. In this example, the power converter further includes a shunt resistance which is inserted between the current detecting terminal and the negative main pole of the transistor, a DC comparison voltage source which has a reference potential at the negative main pole of the transistor, and a comparator in which one of a pair of input terminals is connected to a junction of the shunt resistance and the current detecting terminal and the DC comparison voltage source is connected to the other of the input terminals. In addition, the comparator compares a potential difference of the shunt resistance with a voltage of the DC comparison voltage source so as to output an overcurrent detecting signal of the insulated-gate transistor. Also included is a capacitor which is inserted in parallel with the drive circuit of the insulated-gate transistor, between positive and negative feeding points of the drive circuit, with the negative feeding point being connected to the negative main pole of the transistor, a first diode which is inserted between the positive feeding point and the insulated gate such that an anode of the first diode is connected to the insulated gate, a second diode which is inserted between the insulated gate and the current detecting terminal such that a cathode of the second diode is connected to the insulated gate, and a third diode which is inserted between the current detecting terminal and the negative main pole of the transistor such that a cathode of the third diode is connected to an anode of the second diode.

High reliability is obtained inexpensively such that not only an overcurrent of the insulated-gate bipolar transistor having the current detecting terminal can be detected but it is possible to positively prevent a breakdown of the insulated gate, the drive circuit, the comparator for overcurrent detection, etc. due to a surge voltage applied between a positive main pole and the negative main pole of the transistor, especially a minus surge voltage leading to higher potential at its negative pole through potential reversal.

Meanwhile, a ninth example of the present invention is directed to a power converter of one of the first to eighth example and includes a shunt resistance which is inserted into an output line connecting the main circuit and the load, an amplifier for amplifying a voltage drop of the shunt resistance, a pulsing circuit which receives an output signal of the amplifier so as to output a pulse signal subjected to pulse width modulation, and an additional level shift circuit in which a reference potential at its input side is set in a floating state relative to that at its output side. The additional level shift circuit receives the pulse signal so as to transmit the pulse signal from the input side to the output side by shifting a level of a reference potential of the pulse signal such that a load current is detected on the basis of an output signal of the further level shift circuit.

Namely, the detection signal is transmitted by the level shift circuit to the output side set in a floating state relatively and the pulsing circuit for converting the analog detection signal into a digital signal optimized for minimization of the number of pulses per unit time, i.e., the pulse signal subjected to pulse width modulation is provided upstream of the level shift circuit. Accordingly, since the detection signal can be transmitted through the level shift circuit efficiently and a non-contact type current detecting element is not required to be used for detecting the load current, a compact and highly accurate detecting unit of low power consumption is obtained and can be incorporated into a package.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED ASPECTS

Figure 1:
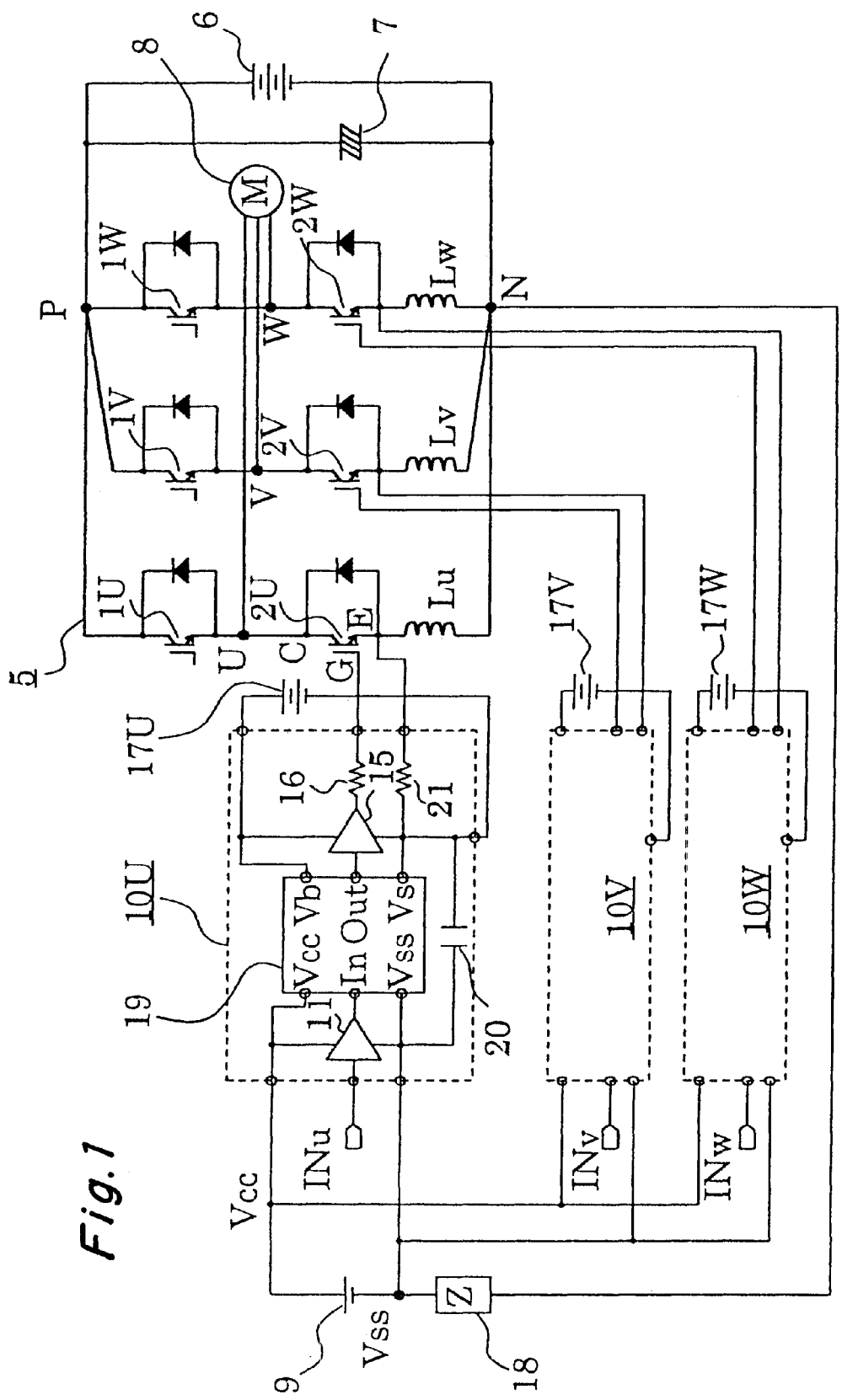
FIG. 1 is a block circuit diagram of an inverter according to a first aspect of the present invention.

Referring now to the drawings, wherein like reference numerals designate identical or corresponding parts throughout the several views, the present invention will be described in more detail.

Figure 2:
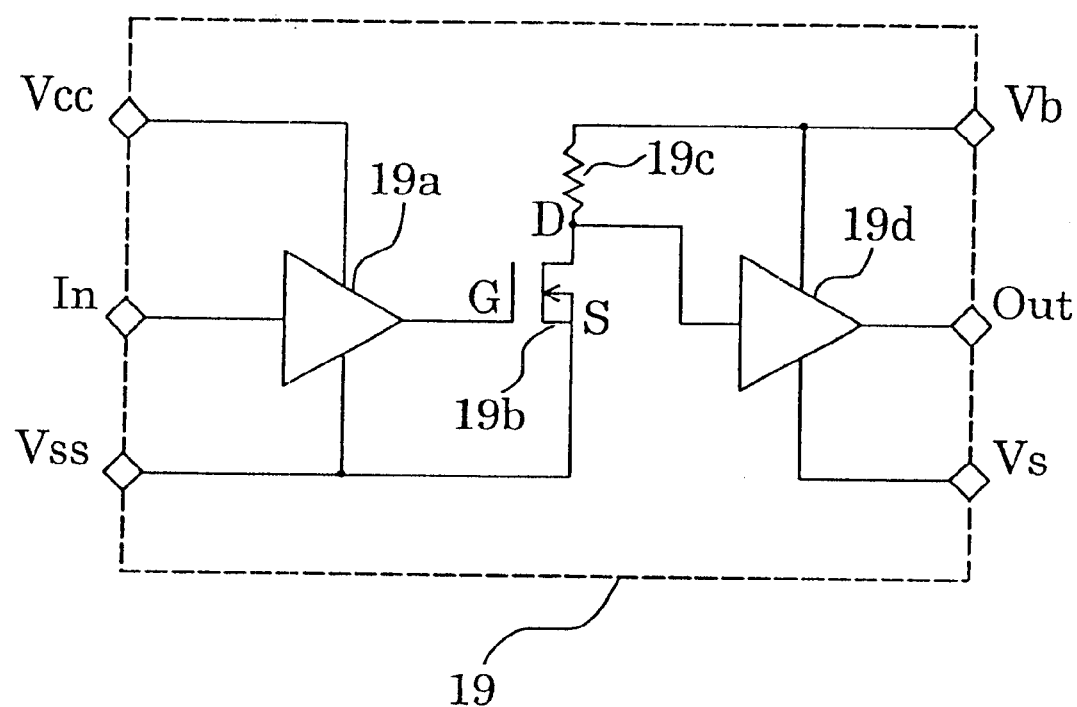
FIG. 2 is a diagram showing details of a level shift circuit shown in FIG. 1.

FIG. 1 is a diagram showing a block circuit of an inverter for controlling a drive of a three-phase induction motor, which is a power converter according to a first aspect of the present invention. Further, FIG. 2 is a circuit diagram showing details of a level shift circuit in the block circuit of the inverter shown in FIG. 1. In these figures, parts designated by reference numerals identical with those of the background art are identical with or similar to those of the background art.

In FIG. 1, an inductor 18 is inserted between a negative-pole input terminal N connected to a negative pole of a DC main power source 6 in a main circuit 5 and a negative terminal Vss, which is a junction of a negative pole of a DC control power source 9 and a negative pole of an input circuit section of each of the drive control circuits 10U, 10V and 10W. To transmit a signal to an output side at which a reference potential is set in a floating state relative to that at an input side, a level shift circuit 19 outputs the reference potential by shifting level of the reference potential.

As shown in FIG. 2, the level shift circuit 19 includes an input amplifier 19a, a metal-oxide-semiconductor field-effect transistor (MOSFET) 19b and an output amplifier 19d which are subjected to cascade connection. The input amplifier 19a receives a power supply from a positive terminal Vcc and a negative terminal Vss, which are input power source terminals, while the output amplifier 19d receives a power supply from a positive terminal Vb and a negative terminal Vs, which are output power source terminals. A source S of the MOSFET 19b is connected to the input negative terminal Vss and its drain D is connected to the positive terminal Vb via a load resistance 19c.

Further, a capacitor 20 (see FIG. 1) is inserted between the input negative terminal Vss and the output negative terminal Vs of the level shift circuit 19, while a resistance 21 is inserted between the negative terminal Vs and an emitter E of an insulated-gate bipolar transistor (IGBT) 2U. An inherent resistance value of a gate resistance 16 is divided into two portions so as to be equal to a sum of resistance values of the gate resistance 16 and the resistance 21 such that the two portions are respectively set at the resistance values of the gate resistance 16 and the resistance 21. Meanwhile, since the parts designated by other reference numerals in FIGS. 1 and 2 are identical with or similar to those of FIG. 11, a description is abbreviated.

An operation of the inverter shown in FIGS. 1 and 2 will now be described. Initially, pulse width modulation (PWM) signals (i.e., control signals) output by a PWM control circuit (not shown) to perform variable speed control of a three-phase induction motor 8 acting as a load are respectively input to the input terminals INu, INv and INw of the drive control circuits 10U, 10V and 10W. Then, the control signal input to the input terminal INu is amplified by an amplifier 11 so as to be input to an input terminal In of the level shift circuit 19 and is output from its output terminal Out through a level shift of its reference potential so as to be transmitted to a subsequent drive circuit 15 in a floating state.

Namely, the output side of the level shift circuit 19 is set in a floating state relative to the input side. Further, the source S of the MOSFET 19b is connected to the input negative terminal Vss and the drain D is connected to the positive terminal Vb through the load resistance 19c. Thus, when the control signal is input to the input terminal INu and is then input to an insulated gate G of the MOSFET 19b after having been amplified by the input amplifier 19a, the control signal is output from the drain D by the MOSFET 19b by shifting a level of a potential of the negative terminal Vss, which is the reference potential of the control signal, to a level of a potential of the negative terminal Vs, which is an output reference potential, and is amplified by the output amplifier 19d so as to be output from the output terminal Out. The output signal of the level shift signal 19 is amplified by the drive circuit 15 and is input, as a drive voltage signal, to an insulated gate G of the IGBT 2U via the gate resistance 16 so as to perform an on-off drive of the IGBT 2U. By performing an on-off drive of other low-side IGBTs 2V and 2W and the high-side IGBTs 1U, 1V and 1W similarly, a variable speed control of the three-phase induction motor 8 is performed by PWM control.

In case the level shift circuit 19 is used for transmitting to the drive circuit 15 in a floating state the control signal input to the input terminal INu, connection of the negative terminal Vss of the input circuit section of the drive control circuit 10U to the input terminal N of the main circuit 5 (which is not necessary in background art of FIG. 11 employing a photocoupler 12) is required to be performed for circuitry operation. However, if the negative terminal Vss and the input terminal N are merely connected to each other, a phenomenon happens when a surge voltage, especially a minus surge voltage for causing the input terminal N to have a voltage higher than that of the emitter E of the IGBT 2U through potential inversion is induced in a parasitic inductance Lu of a line connecting the emitter E of the IGBT 2U and the input terminal N that voltage is applied between the input negative terminal Vss connected to the input terminal N and the output negative terminal Vs connected to the emitter E in the level shift circuit 19 such that voltage of the negative terminal Vs is lower than that of the negative terminal Vss. As a result, since a voltage of the drain D of the MOSFET 19b may become lower than that of the source S, such risks are incurred that the MOSFET 19b does not operate properly and is damaged.

However, since the inductor 18 is inserted between the input terminal N and the negative terminal Vss, the surge voltage induced in the parasitic inductance Lu can be cancelled or restrained. Meanwhile, since the capacitor 20 is inserted between the input negative terminal Vss and the output negative terminal Vs of the level shift circuit 19, a potential difference between the negative terminals Vss and Vs due to the surge voltage referred to above is reduced by by-passing the surge voltage. Furthermore, since the resistance 21 is inserted between the negative terminal Vs and the emitter E of the IGBT 2U, a voltage of the negative terminal Vs is less likely to follow up voltage of the emitter E. As a result, since the reference potential of the negative terminal Vss becomes substantially equal to that of the negative terminal Vs, the MOSFET 19b can operate properly at all times and is free from a damage thereto.

Namely, even if the voltage of the emitter E of the IGBT 2U drops far below that of the input terminal N due to the induced voltage of the parasitic inductance Lu, the voltage of the negative terminal Vs is prevented by insertion of the inductor 18, the capacitor 20 and the resistance 21 from dropping far below that of the negative terminal Vss. Thus, the level shift circuit 19 is less likely to be damaged or malfunction.

By employing the level shift circuit 19 including the MOSFET 19b to transmit the signal to the subsequent circuit in a floating state as described above, the level shift circuit 19 is expected to have a longer service life than the hitherto frequently used photocoupler and can be made compact and inexpensive.

The drive control circuits 10V and 10W for the low-side IGBTs 2V and 2W, which are not specifically shown, and the drive control circuits (not shown) for the high-side IGBTs 1U, 1V and 1W operate likewise and gain similar effects.

Meanwhile, in the level shift circuit shown in FIG. 2, the MOSFET is used as a transistor for performing level shift of the signal to be transmitted. However, the transistor is not restricted to the MOSFET, and an IGBT or an uninsulated gate type bipolar transistor may also be used as the transistor so as to achieve similar effects.

Figure 3:
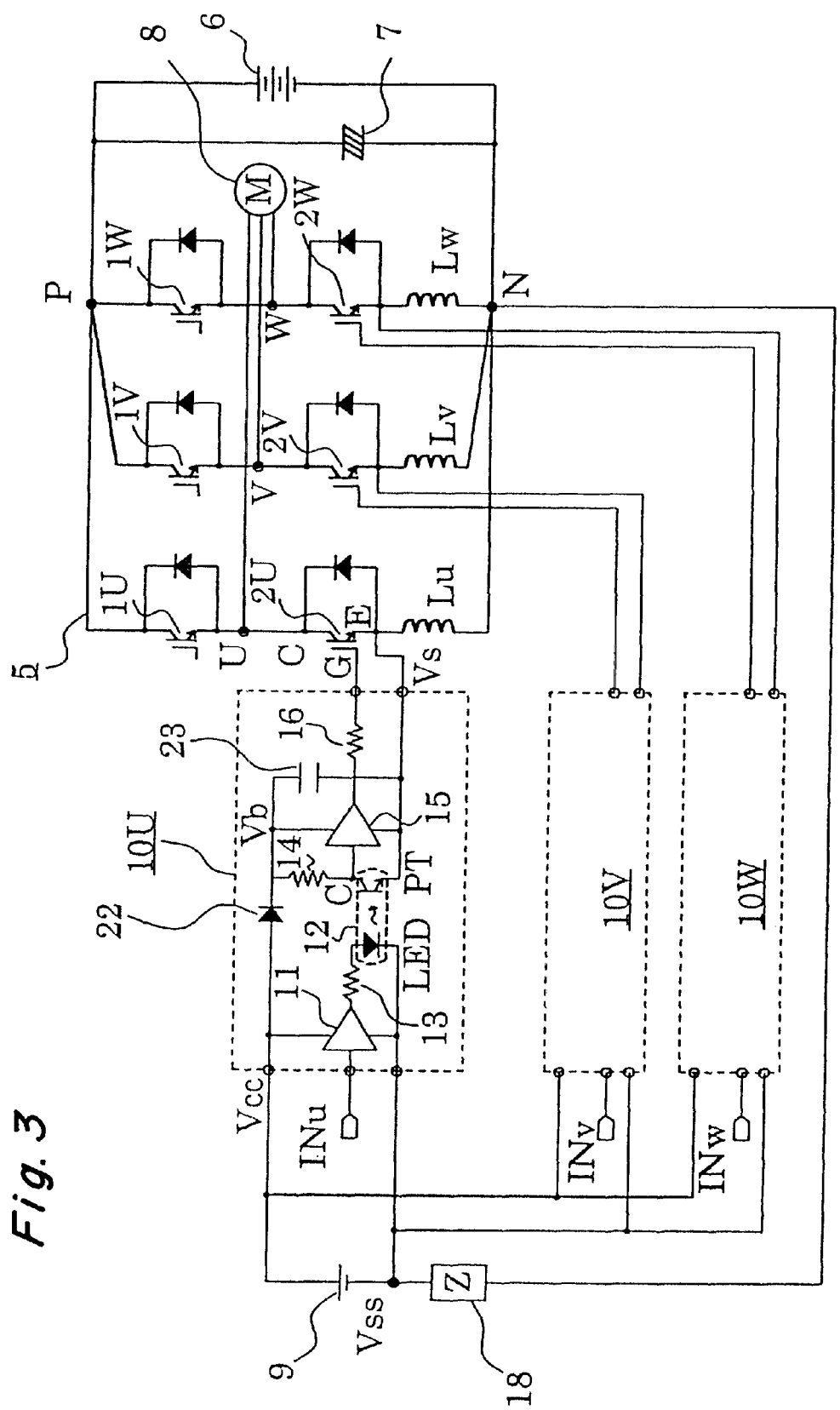
FIG. 3 is a block circuit diagram of an inverter according to a second aspect of the present invention.

FIG. 3 is a diagram showing a block circuit of an inverter which is a power converter according to a second aspect of the present invention. In FIG. 3, an output circuit section of the drive control circuit 10U is formed by a series circuit of a phototransistor PT of a photocoupler 12 and a load resistance 14, and the drive circuit 15. A diode 22 is inserted between a positive pole of the DC control power source 9 and the positive terminal Vb, which is a positive junction between the series circuit of the phototransistor PT of the photocoupler 12 and the load resistance 14 and the drive circuit 15 such that a cathode of the diode 22 leads to the positive terminal Vb. Further, a capacitor 23 is inserted between the positive terminal Vb and the negative terminal Vs. The input terminal N of the main circuit 5 and the negative pole of the DC control power source 9 are connected to each other through the inductor 18 so as to form a return circuit for allowing an electric current to flow from the positive pole of the DC control power source 9 to the output circuit section of the drive control circuit 10U via the diode 22.

Meanwhile, the drive control circuits 10V and 10W for the low-side IGBTs 2V and 2W and the drive control circuits (not shown) for the high-side IGBTs 1U, 1V and 1W also have similar configurations. In addition, the positive pole Vcc of the DC control power source 9 is also connected to the drive control circuits (not shown) for the high-side IGBTs 1U, 1V and 1W. Since parts designated by other reference numerals are identical with or similar to those of FIGS. 1, 2 and 11, the description thereof is abbreviated.

An operation of the inverter shown in FIG. 3 will now be described. The DC control power source 9 not only supplies electric power to the amplifier 11 by way of the positive terminal Vcc and the negative terminal Vss in the input circuit section of the drive control circuit 10U so as to act as its control power source, but also supplies electric power through the diode 22 to the output circuit section of the drive control circuit 10U, i.e., the series circuit of the phototransistor PT and the load resistance 14 and the drive circuit 15 so as to act as their drive power source. The DC control power source 9 further electrically charges the capacitor 23. When a potential of the output circuit section set in a floating state relative to the input circuit section in the drive control circuit 10U becomes higher than that of the input circuit section temporarily, and thus the DC control power source 9 is not capable of supplying electric power to the output circuit section, electric power is supplied to the output circuit section from the capacitor 23.

Further, electric current which has flown into the output circuit section of the drive control circuit 10U through the diode 22 from the DC control power source 9 returns to the DC control power source 9 via the negative terminal Vs, the emitter E of the IGBT 2U, the input terminal N of the main circuit 5 and the inductor 18. Since an operation of the inverter for performing variable speed control of the three-phase induction motor 8 acting as the load is similar to that of background art of FIG. 11, the description thereof is abbreviated.

Figure 11:
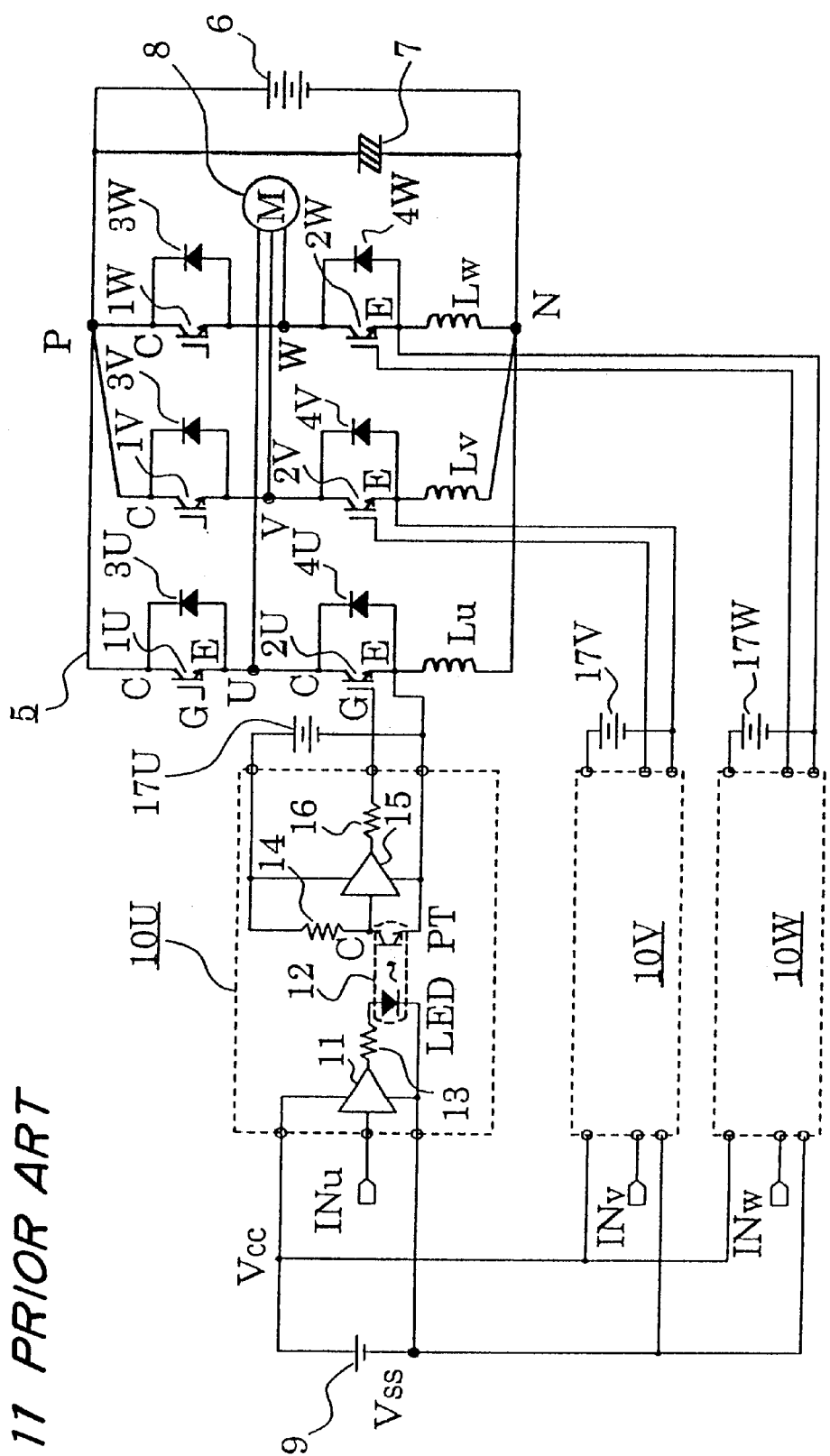
FIG. 11 is a block circuit diagram of a background art inverter.

In the above described configuration, a charging circuit formed by the diode 22 and the capacitor 23 functions in the same manner as a DC drive power source 17U in the background art circuit of FIG. 11. If the above charging circuit is also used in the low-side V and W phases and likewise in the drive control circuits (not shown) for the high-side IGBTs 1U, 1V and 1W, the circuit formed by the diode 22 and the capacitor 23 functions as a bootstrap circuit, so that the input circuit sections and the output circuit sections of the above six drive control circuits can be driven by only the single DC control power source 9. Thus, it is possible to obtain the inverter which not only is compact and inexpensive but operates stably.

Figure 4:
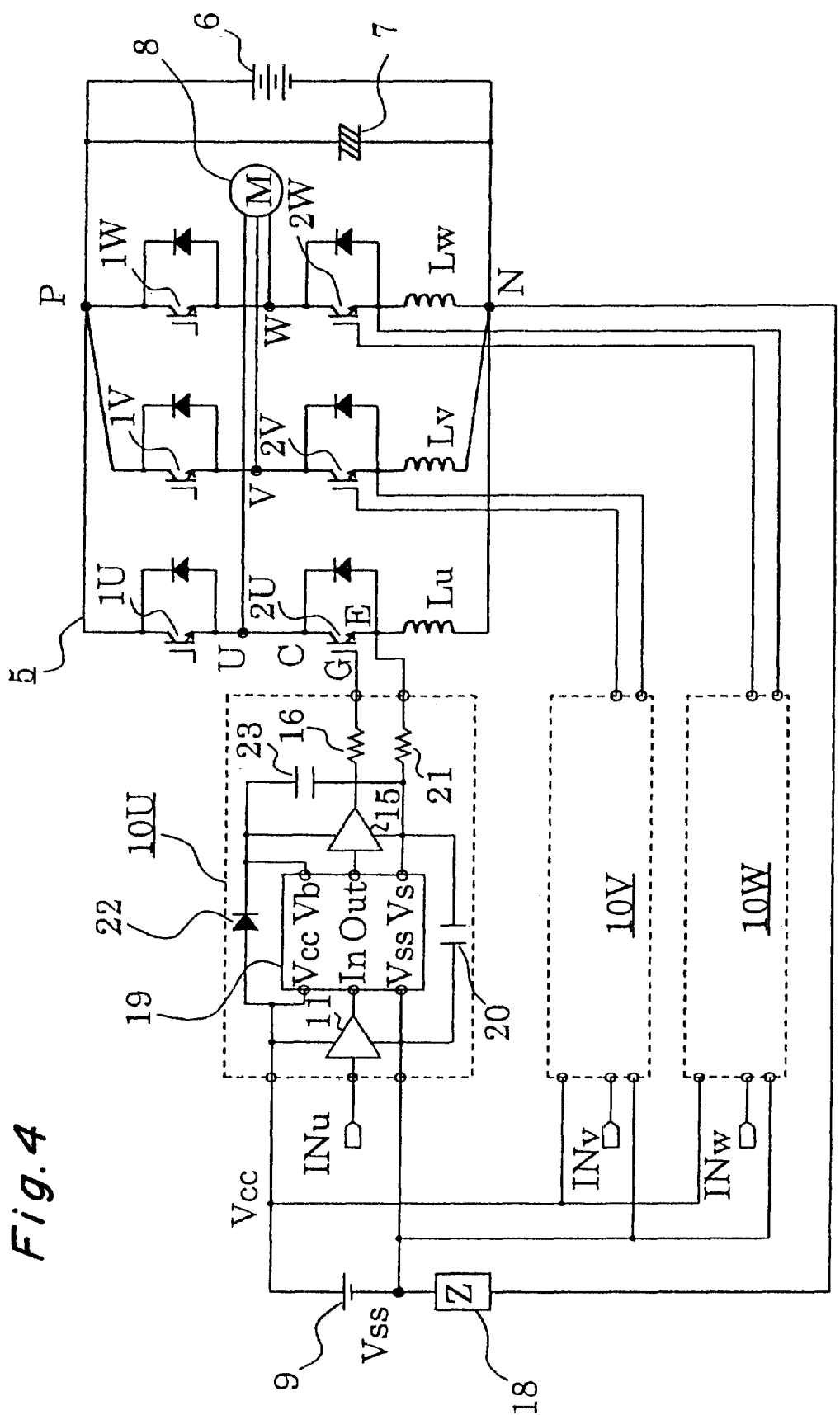
FIG. 4 is a block circuit diagram of an inverter according to a third aspect of the present invention.

FIG. 4 is a diagram showing a block circuit of an inverter according to a third aspect of the present invention. In FIG. 4, the level shift circuit 19 is provided in place of the photocoupler 12, the protective resistance 13 and the load resistance 14 in the block circuit of the inverter of the second aspect shown in FIG. 3. Further, the diode 22 is inserted between the input positive terminal Vcc and the output positive terminal Vb of the level shift circuit 19 such that its cathode leads to the positive terminal Vb, while the capacitor 23 is inserted between the output positive terminal Vb and the output negative terminal Vs. Meanwhile, the drive control circuits 10V and 10W for the low-side IGBTs 2V and 2W and the drive control circuits (not shown) for the high-side IGBTs 1U, 1V and 1W also have similar configurations. Since parts designated by other reference numerals are identical with or similar to those of FIGS. 1 and 3, the description thereof is abbreviated.

An operation of the inverter shown in FIG. 4 will now be described. The input circuit section of the drive control circuit 10U is formed by the amplifier 11 and an input circuit section of the level shift circuit 19, while the output circuit section of the drive control circuit 10U is formed by an output circuit section of the level shift circuit 19 and the drive circuit 15. The DC control power source 9 not only supplies electric power to the amplifier 11 and between the positive terminal Vcc and the negative terminal Vss of the input circuit section of the level shift circuit 19 so as to act as their control power source, but also supplies electric power to the output circuit section of the level shift circuit 19 and the drive circuit 15 so as to act as their drive power source. The DC control power source 9 further electrically charges the capacitor 23. When the output circuit section set in a floating state relative to the input circuit section in the drive control circuit 10U assumes a high voltage temporarily, and thus the DC control power source 9 is not capable of supplying electric power to the output circuit section, electric power is supplied to the output circuit section from the capacitor 23.

Further, electric current which has flown into the output circuit section of the drive control circuit 10U through the diode 22 from the DC control power source 9 returns to the DC control power source 9 via the negative terminal Vs, the emitter E of the IGBT 2U, the input terminal N of the main circuit 5 and the inductor 18. Since an operation of the inverter for performing a variable speed control of the three-phase induction motor 8 acting as the load is similar to that of the background art of FIG. 11, the description thereof is abbreviated.

In the above described configuration, by employing the level shift circuit 19 including the MOSFET to transmit the signal from the input circuit section to the output circuit section in a floating state in each of the drive control circuits 10U, 10V and 10W, the level shift circuit 19 is expected to have a long service life and can be made compact and inexpensive. Furthermore, by inserting the inductor 18, the capacitor 20 and the resistance 21, an influence exerted by a surge voltage caused by the parasitic inductances Lu, Lv and Lw of the lines of the main circuit 5, etc. is warded off and it is possible to obtain the highly reliable inverter in which damage to the level shift circuit 19 and malfunction of the IGBT 2U are less likely to occur. In addition, by employing the charging circuit formed by the diode 22 and the capacitor 23, the input circuit sections and the output circuit sections of a total of the six drive control circuits for the low-side U, V and W phases and the high-side U, V and W phases can be driven by only the single DC control power source 9. Thus, it is possible to obtain the inverter which not only is compact and inexpensive but operates stably.

Figure 5:
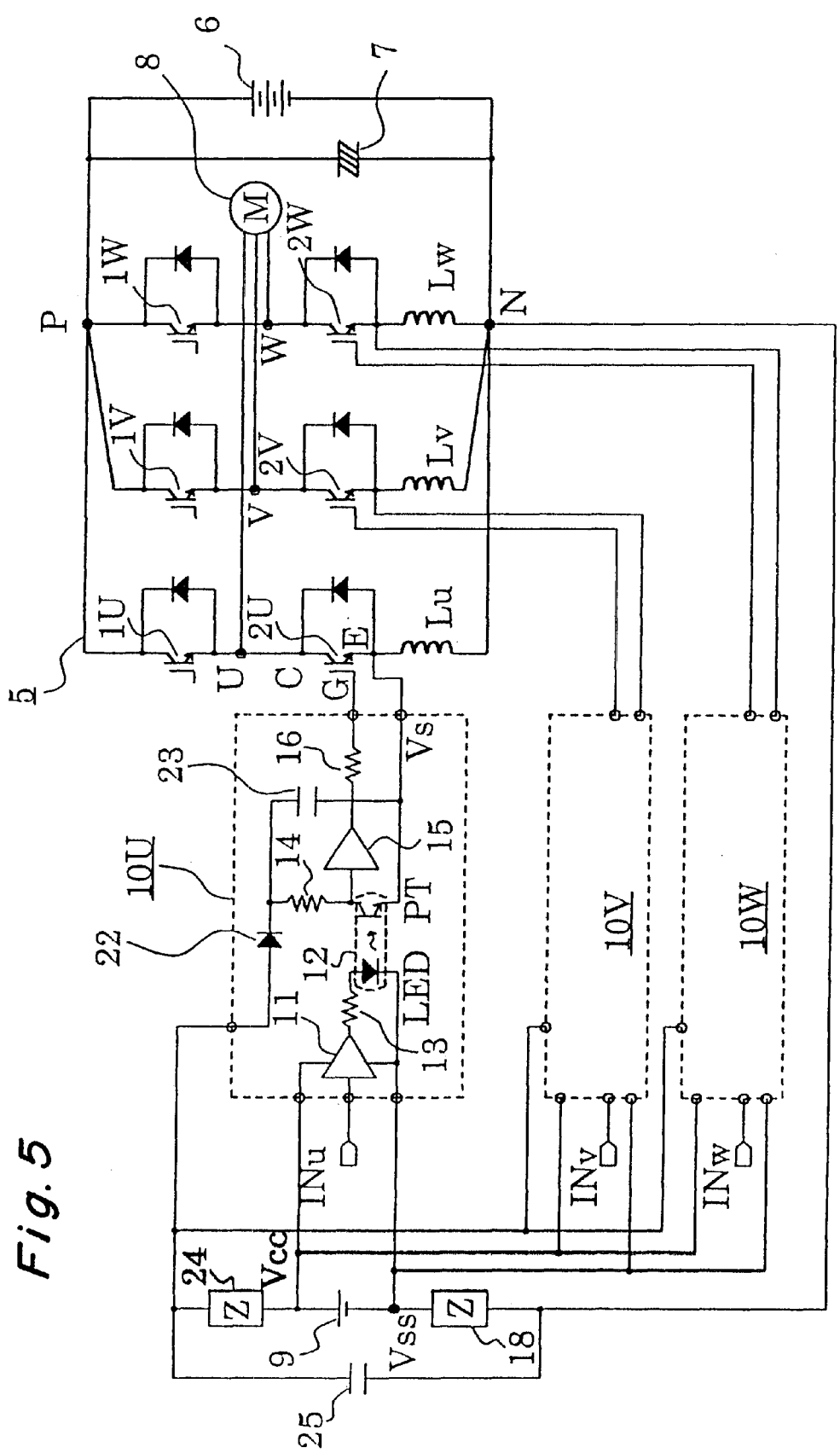
FIG. 5 is a block circuit diagram of an inverter according to a fourth aspect of the present invention.

FIG. 5 is a diagram showing a block circuit of an inverter according to a fourth aspect of the present invention. In FIG. 5, one end of an inductor 24 is connected to the positive pole (positive terminal Vcc) of the DC control power source 9 and the other end of the inductor 24 is connected to the output circuit section of the drive control circuit 10U through the diode 22. A capacitor 25 is connected between the input terminal N and the diode 22, namely, is inserted in parallel with a series circuit formed by the inductor 18, the DC control power source 9 and the inductor 24. One end of each of the inductor 24 and the capacitor 25 is connected to an anode of the diode 22. Since other circuitry configurations are identical with those of FIG. 3, the description thereof is abbreviated.

An operation of the inverter shown in FIG. 5 will now be described. The DC control power source 9 not only supplies electric power to the amplifier 11 by way of the positive terminal Vcc and the negative terminal Vss in the input circuit section of the drive control circuit 10U, but also supplies electric power through the inductor 24 and the diode 22 to the output circuit section of the drive control circuit 10U, i.e., the series circuit of the phototransistor PT and the load resistance 14 and the drive circuit 15. The DC control power source 9 further electrically charges the capacitor 23. When the output circuit section insulated from the input circuit section and set in floating state in the drive control circuit 10U assumes a high voltage temporarily, and thus the DC control power source 9 is not capable of supplying electric power to the output circuit section, electric power is supplied to the output circuit section from the capacitor 23 instead.

Electric current which has flown into the output circuit section of the drive control circuit 10U through the inductor 24 and the diode 22 from the DC control power source 9 returns to the DC control power source 9 via the negative terminal Vs, the emitter E of the IGBT 2U, the input terminal N of the main circuit 5 and the inductor 18. Since an operation of the inverter for performing variable speed control of the three-phase induction motor 8 acting as the load is similar to that of the background art of FIG. 11, the description thereof is omitted.

In the above described configuration, the inverter usually operates in the same manner as the inverter of the second aspect of FIG. 3. However, in case a surge voltage is generated in the main circuit 5 and penetrates into the drive control circuit 10U, this surge voltage is not only restrained by the inductors 18 and 24 from penetrating into the input circuit section of the drive control circuit 10U but is by-passed by the capacitor 25. Hence, for example, a surge voltage induced by the parasitic inductance Lu is escaped by way of the input terminal N of the main circuit 5, the capacitor 25, the diode 22, the capacitor 23 and the emitter E of the IGBT 2U, and thus the drive control circuit 10U is substantially free from influence of the surge voltage. Since the same applies to the drive control circuits 10V and 10W, it is possible to obtain an ideal circuit against surge voltage.

Figure 6:
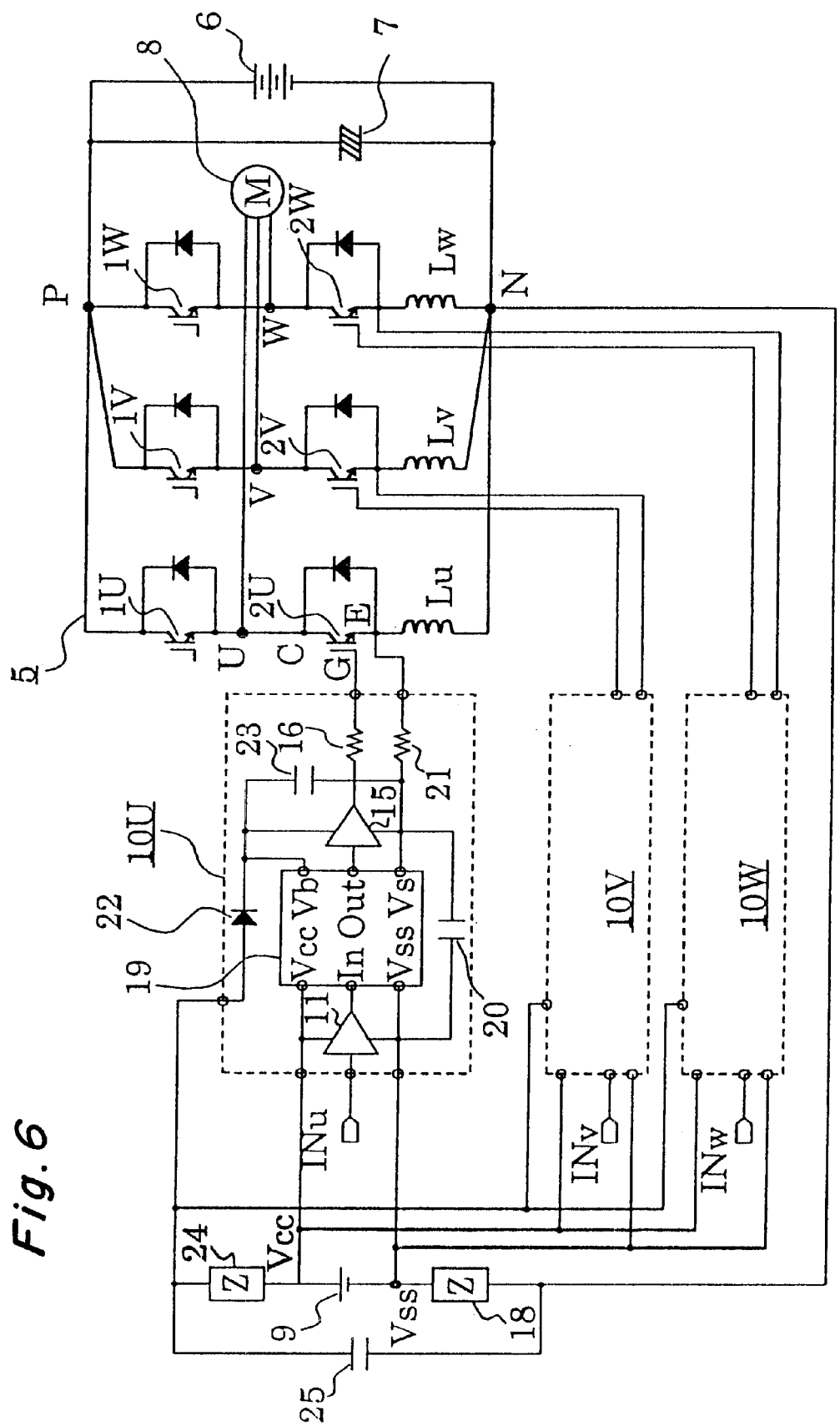
FIG. 6 is a block circuit diagram of an inverter according to a fifth aspect of the present invention.

Turning now to FIG. 6, which is a diagram showing a block circuit of an inverter according to a fifth aspect of the present invention. In FIG. 6, the level shift circuit 19 is provided in place of the photocoupler 12, the protective resistance 13 and the load resistance 14 in the block circuit of the inverter of the fourth aspect of FIG. 5. Since other circuitry configurations are identical with those of FIG. 5, the description thereof is omitted.

Further, an operation of the inverter of FIG. 6 is substantially the same as that of the inverter of the third aspect of FIG. 4. In addition, in case a surge voltage is generated in the main circuit 5 and penetrates into the drive control circuit 10U, the inverter of FIG. 6 operates substantially in the same manner as the block circuit of the inverter of FIG. 5. Namely, the block circuit of the inverter of FIG. 6 provides an ideal inverter which has features of both the inverter of the third aspect of FIG. 4 and the inverter of the fourth aspect of FIG. 5.

The drive control circuits 10V and 10W for the low-side IGBTs 2V and 2W, which are not specifically shown, and drive control circuits (not shown) for the high-side IGBTs 1U, 1V and 1W operate likewise and gain similar effects.

In the inverters of the first, third and fifth aspects of FIGS. 1, 4 and 6, the inductor 18, the capacitor 20 and the resistance 21 are inserted so as to exclude adverse influence exerted on the MOSFET 19b by a surge voltage, especially a minus surge voltage induced in the parasitic inductance Lu. However, all of the inductor 18, the capacitor 20 and the resistance 21 are not necessarily required to be inserted, but effects sufficient for practical use can be obtained by inserting at least one of the inductor 18, the capacitor 20 and the resistance 21.

Meanwhile, in the inverters of the first to fifth aspects shown in FIGS. 1 and 3 to 6, a resistance (not shown) may be inserted in place of the inductor 18 or a series circuit including the inductor and the resistance may be inserted, whereby it is possible to restrain influence of an induced voltage of the parasitic inductance Lu.

Furthermore, in the inverters of the first, third and fifth aspects of FIGS. 1, 4 and 6, an inductor (not shown) may be inserted in place of the resistance 21 or a series circuit including the inductor and the resistance may be inserted, whereby it is possible to restrain influence of induced voltage of the parasitic resistance Lu.

Meanwhile, in the inverters of the fourth and fifth aspects of FIGS. 5 and 6, a resistance (not shown) may be inserted in place of the inductor 24 or a series circuit including the inductor and the resistance may be inserted, whereby it is possible to restrain penetration of induced voltage of the parasitic inductance Lu.

Moreover, in the inverters of the first to fifth aspects shown in FIGS. 1 and 3 to 6, the IGBT is used as a switching semiconductor element. However, the switching semiconductor element is not limited to the IGBT, but a power MOSFET or the like may be used as the switching semiconductor element so as to achieve similar effects.

Figure 7:
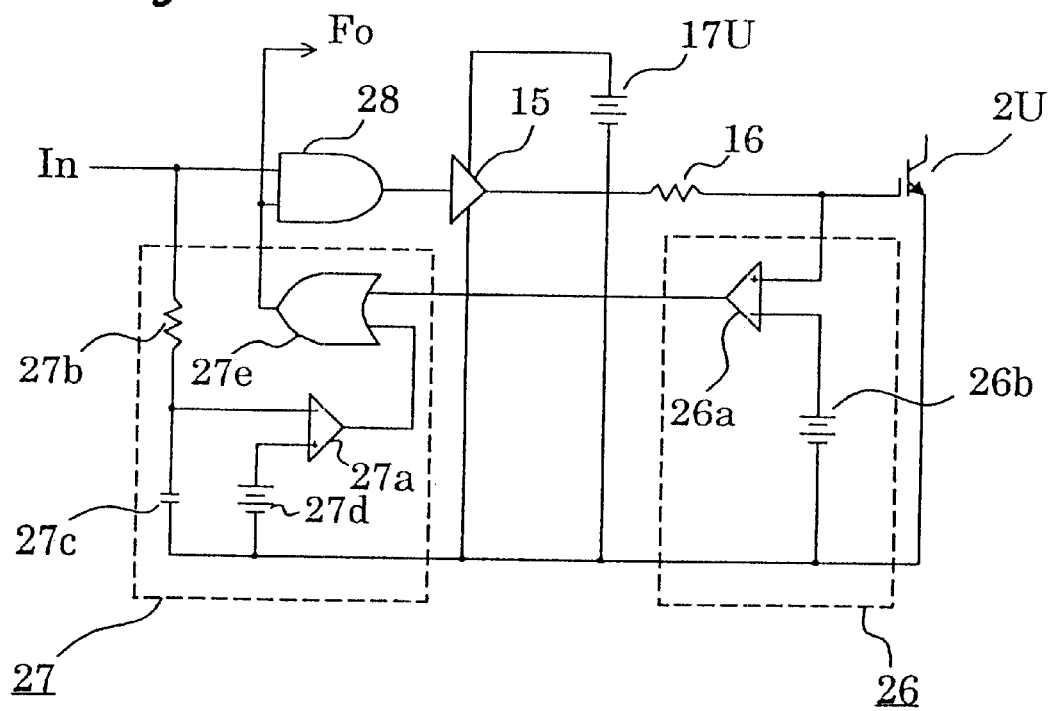
FIG. 7 is a diagram showing a self-diagnosis circuit for a switching semiconductor element, according to a sixth aspect of the present invention.

Turning now to FIG. 7, which is a circuit diagram showing a self-diagnosis circuit for performing a self-diagnosis on a presence or absence of failure of the IGBT acting as the switching semiconductor element in a sixth aspect of the present invention. The self-diagnosis circuit is adapted to be incorporated into the inverter circuits of the first to fifth aspects shown in FIGS. 1 to 6.

In FIG. 7, a gate voltage detecting circuit 26 for detecting a gate voltage of the IGBT 2U is formed by a comparator 26a and a DC comparison power source 26b having its reference voltage at the emitter E of the IGBT 2U and its output voltage which is about two-thirds of a normal gate voltage of the IGBT 2U. One input terminal of the comparator 26a is connected to the gate G of the IGBT 2U, while the other input terminal of the comparator 26a is connected to the DC comparison power source 26b.

An abnormality signal invalidating circuit 27 is provided for generating, in detection of the gate voltage, a certain time lag during which a normal signal is output. The abnormality signal invalidating circuit 27 is formed by a comparator 27a, a series circuit including a resistance 27b and a capacitor 27c, a DC comparison power source 27d having its reference voltage at the emitter E of the IGBT 2U and its output voltage (which is about two-thirds of the normal gate voltage of the IGBT 2U), and an OR circuit 27e. One end of the resistance 27b in the series circuit including the resistance 27b and the capacitor 27c is connected to the input terminal In of the drive circuit 15 of the IGBT 2U, while one end of the capacitor 27c is connected to the emitter E of the IGBT 2U. Meanwhile, a junction of the resistance 27b and the capacitor 27c is connected to one input terminal of the comparator 27a, while a voltage of the DC comparison power source 27d is applied to the other input terminal of the comparator 27a. Further, output signals of the comparators 26a and 27a are input to the OR circuit 27e.

In addition, an AND circuit 28 is inserted at an input side of the drive circuit 15 of the IGBT 2U. A control signal input to the input terminal In is input to one input terminal of the AND circuit 28 and an output signal of the OR circuit 27e is input to the other input terminal of the AND circuit 28 such that an output signal of the AND circuit 28 is input to the drive circuit 15. The gate voltage detecting circuit 26, the abnormality signal invalidating circuit 27 and the AND circuit 28 form the self-diagnosis circuit for the IGBT, which monitors the gate voltage of the IGBT 2U, and at the time of abnormality such as a short circuit between the gate G and the emitter E, not only stops driving the IGBT 2U, but outputs an alarm signal. This self-diagnosis circuit for the IGBT is provided for each of the IGBTs forming the main circuit 5. Since parts designated by other reference numerals are identical with or similar to those of FIGS. 1 to 6, the description thereof is omitted.

An operation of the self-diagnosis circuit for the IGBT, which is shown in FIG. 7, will now be described. Initially, the control signal is input to the input terminal In and is amplified by the drive circuit 15 so as to be input, as a drive voltage signal, to the gate G of the IGBT 2U via the gate resistance 16. The gate G is an insulated gate. Thus, if there is not an abnormality between the gate G and the emitter E, a charging current corresponding to an applied gate voltage, the gate resistance 16 and the parasitic capacity between the gate G and the emitter E flows into the gate G, so that a voltage of the gate G rises gradually so as to be saturated and becomes substantially equal to the applied voltage in a predetermined period. However, if a short circuit occurs between the gate G and the emitter E, electric current flows between the gate G and the emitter E, and thus a voltage of the gate G does not rise.

On the other hand, the comparator 26a compares the input gate voltage with the voltage of the DC comparison power source 26b and outputs a high-level signal when the gate voltage is higher than the voltage of the DC comparison power source 26b. Namely, the voltage of the DC comparison power source 26b is set at about two-thirds of the normal gate voltage of the gate G. Thus, if there is not an abnormality between the gate G and the emitter E, a relationship between the voltage of the gate G and the voltage of the DC comparison power source 26b, which are input to the comparator 26a, is reversed. That is, the voltage of the gate G becomes higher than that of the DC comparison power source 26b at a time point t1 with a predetermined time lag from a time point t0 at which the control signal is input from the input terminal In, so that the comparator 26a outputs the high-level signal indicating that there is not an abnormality between the gate G and the emitter E. However, if a short circuit occurs between the gate G and the emitter E, a relationship between the voltage of the gate G and the voltage of the DC comparison power source 26b which are input to the comparator 26a is not reversed even after the time point t1, so that the comparator 26a continues to output a low-level signal indicating that there is an abnormality between the gate G and the emitter E.

Even if there is not an abnormality between the gate G and the emitter E, the gate voltage detecting circuit 26 outputs, during a period from the time point t0 of input of the control signal from the input terminal In to the time point t1 of reversal of output of the comparator 26a, the low-level signal indicating that there is an abnormality between the gate G and the emitter E as described above. Hence, it is necessary to invalidate the output signal of the gate voltage detecting circuit 26 during the above period. Otherwise, such a disadvantage is incurred that although there is no abnormality between the gate G and the emitter E, the inverter is stopped upon actuation of a protective circuit (not shown) in response to an output of the abnormality signal.

Further, in the abnormality signal invalidating circuit 27, the comparator 27a compares a voltage of the capacitor 27c with the voltage of the DC comparison power source 27d so as to output a high-level signal while the voltage of the capacitor 27c is lower than that of the DC comparison power source 27d. When the voltage of the capacitor 27c becomes higher than that of the DC comparison power source 27d upon reversal of the voltages under comparison, the comparator 27a outputs a low-level signal. Namely, when the voltage of the capacitor 27c electrically charged via the resistance 27b rises from the time point t0 of an input of the control signal from the input terminal In and exceeds that of the DC comparison power source 27d, an output of the comparator 27a is reversed from the high-level signal to the low-level signal. By setting this time point t2 of reversal of an output of the comparator 27a from the high-level signal to the low-level signal to be longer than the time point t1 of reversal of an output of the comparator 26a from the low-level signal to the high-level signal, i.e., (t2>t1), the output signals of the comparators 26a and 27a are input to the OR circuit 27e.

If there is not an abnormality between the gate G and the emitter E, the OR circuit 27e continuously outputs a high-level signal upon an input of the output signals of the comparators 26a and 27a thereto during a period from the time point t0 to the time point t2. However, if there is an abnormality between the gate G and the emitter E, an output of the OR circuit 27e is reversed from the high-level signal to a low-level signal at the time point t2 and the OR circuit 27e outputs the low-level signal thereafter. The output signal of the OR circuit 27e is output, as a disorder detection signal Fo indicating that there is disorder between the gate G and the emitter E, to the PWM control circuit (not shown) and is input to the AND circuit 28 so as to lock the control signal input to the input terminal In from being output to the drive circuit 15 such that the drive voltage signal is prevented from being output from the drive circuit 15 to the IGBT 2U.

In addition to short circuit between the gate G and the emitter E of the IGBT 2U, the thus arranged self-diagnosis circuit for the IGBT detects, as a drop of the gate voltage, abnormalities of the drive circuit 15 and the DC drive power source 17U in the case where the drive voltage signal is not output, as its output signal, from the drive circuit 15 due to a failure of the drive circuit 15 itself and a supply voltage to the drive circuit 15 drops due to an abnormality of the DC drive circuit 17U so as to not only output the disorder detection signal Fo, but to stop operation of the drive circuit 15. The above described self-diagnosis circuit for the IGBT is operated at all times during an operation of the inverter. By operating the self-diagnosis circuit not only during an operation of the inverter, but also prior to turning on a power source of the main circuit 5, deterioration of the corresponding IGBT is detected, so that it is possible to beforehand prevent spread of a breakdown to other IGBTs due to an arm short circuit positively.

Meanwhile, in the self-diagnosis circuit for the IGBT in the sixth aspect shown in FIG. 7, the abnormality signal invalidating circuit 27 is of a type in which a time lag is obtained by utilizing a time constant in the series circuit including the resistance 27b and the capacitor 27c. However, the abnormality signal invalidating circuit 27 is not limited to the above type utilizing the time constant, but may be of, for example, a type in which detection is performed by a pulse counter.

Furthermore, the sixth aspect shown in FIG. 7 is directed, for example, to the self-diagnosis circuit for performing a self-diagnosis on a presence or absence of a failure of the IGBT acting as the switching semiconductor element. However, the object of failure self-diagnosis of this self-diagnosis circuit is not restricted to the IGBT, but may also be a power MOSFET or the like so as to gain similar effects.

Figure 8:
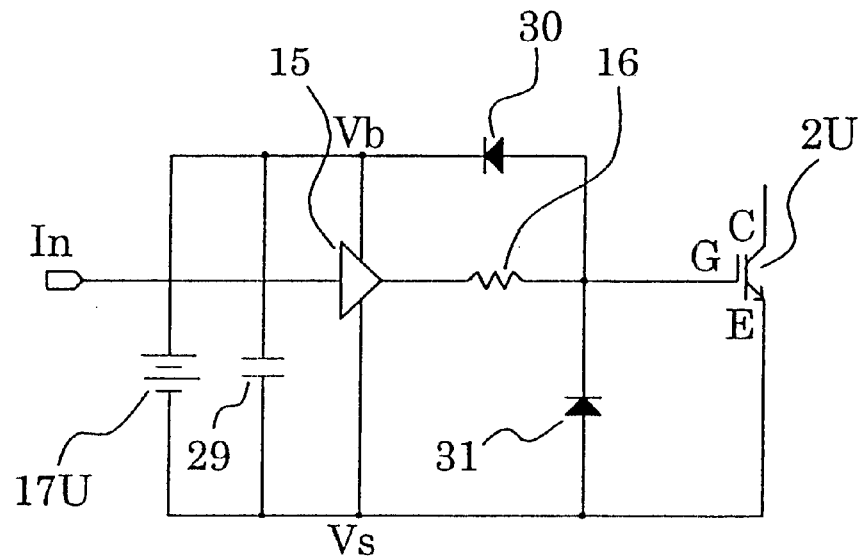
FIG. 8 is a diagram showing an IGBT protective circuit of an inverter according to a seventh aspect of the present invention.

Turing now to FIG. 8, which is a diagram showing a protective circuit for a surge voltage of the IGBT acting as a switching semiconductor element in a seventh aspect of the present invention. The protective circuit is adapted to be incorporated into the inverter circuits of the first to sixth aspects shown in FIGS. 1 to 7.

In FIG. 8, a capacitor 29 is inserted in parallel with the drive circuit 15 of the IGBT 2U and the DC drive power source 17U for supplying electric power to the drive circuit 15, and the emitter E of the IGBT 2U is connected to the negative terminal Vs leading to a negative pole of the capacitor 29. Further, a diode 30 is inserted between the positive terminal Vb (which is a positive junction of the drive circuit 15), the DC drive power source 17U and the capacitor 29, and the gate G of the IGBT 2U such that an anode of the diode 30 is connected to the gate G of the IGBT 2U. A diode 31 is inserted between the gate G and the negative terminal Vs such that a cathode of the diode 31 is connected to the gate G. This protective circuit for a surge voltage of the IGBT is provided for each of all the IGBTs forming the main circuit 5. Since parts designated by other reference numerals are identical with or similar to those of FIGS. 1 to 6, the description thereof is omitted.

An operation of the surge voltage protective circuit shown in FIG. 8 will now be described. A surge voltage applied between a collector C and the emitter E of the IGBT 2U is divided by a parasitic capacity Ccg between the collector C and the gate G, and a parasitic capacity Cge between the gate G and the emitter E such that a comparatively high surge voltage is applied between the gate G and the emitter E. In case a surge voltage in which a potential of the gate G is higher than that of the emitter E is applied, the surge voltage is escaped via the diode 30 and the capacitor 29 by setting a capacity of the capacitor 29 far higher than the parasitic capacity Cge.

Meanwhile, in case a minus surge voltage in which the potential of the gate G is lower than that of the emitter E is applied, the minus surge voltage is escaped through the diode 31. As a result, since an abnormal voltage rise or an abnormal voltage drop in a minus direction between the gate G and the emitter E due to an application of the surge voltage is restrained, especially, a reverse voltage induced between the gate G and the emitter E upon an application of the above mentioned minus surge voltage is restricted as small as a forward voltage drop of the diode 31, a breakdown of the IGBT 2U and the drive circuit 15 can be prevented positively. In addition, since expensive Zener diodes are not required to be provided for the circuitry configuration, the protective circuit can be made inexpensive.

Meanwhile, the seventh aspect shown in FIG. 8 is directed, for example, to the surge voltage protective circuit for the IGBT acting as the switching semiconductor element. However, the object of protection of this surge voltage protective circuit is not restricted to the IGBT, but may also be a power MOSFET or the like so as to achieve similar effects.

Figure 9:
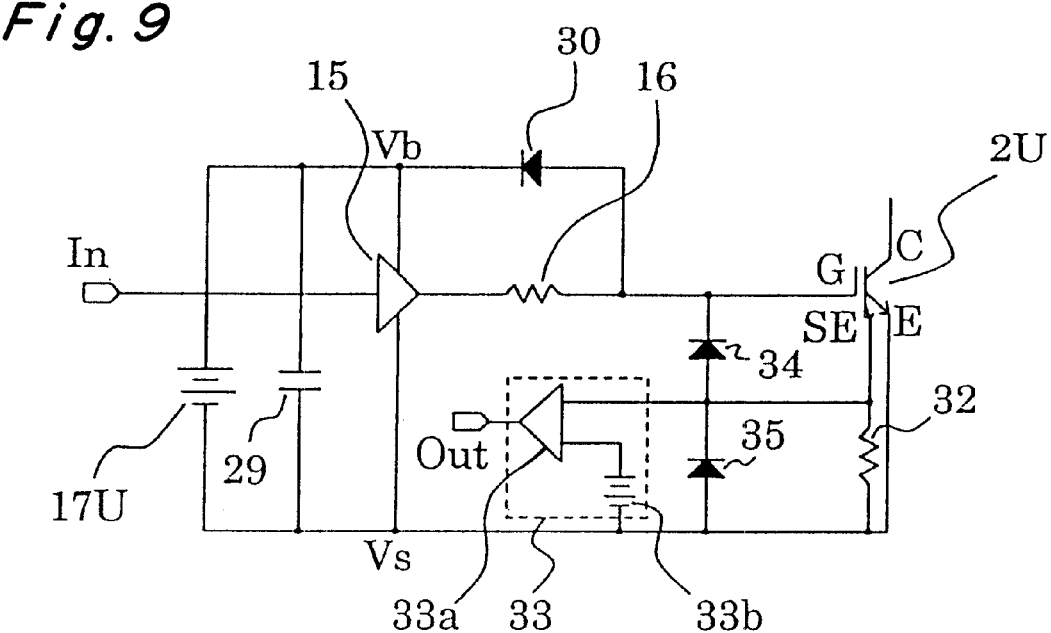
FIG. 9 is a diagram showing a protective circuit for an IGBT with a current detecting terminal in an inverter according to an eighth aspect of the present invention.

FIG. 9 is a block circuit diagram of a protective circuit for a surge voltage of the IGBT with a current detecting terminal, which acts as a switching semiconductor element in an eighth aspect of the present invention. The protective circuit is adapted to be incorporated into the inverter circuits of the first to seventh aspects shown in FIGS. 1 to 8.

In FIG. 9, the IGBT 2U has a current detecting terminal SE provided in parallel with an emitter E, and a shunt resistance 32 is provided between the current detecting terminal SE and the emitter E. An overcurrent detecting circuit 33 for the IGBT 2U is formed by a comparator 33a and a DC comparison voltage source 33b and is inserted between the current detecting terminal SE and the emitter E so as to be provided in parallel with the shunt resistance 32. One of a pair of input terminals of the comparator 33a is connected to a junction of the shunt resistance 32 and the current detecting terminal SE, while the DC comparison voltage source 33b having its reference potential at the emitter E is connected to the other input terminal. Diodes 34 and 35 are connected to each other in series such that a cathode of the diode 34 and an anode of the diode 35 are respectively connected to a gate G and the emitter E. A junction of the diodes 34 and 35 is connected to the junction of the current detecting terminal SE and the shunt resistance 32. This protective circuit for a surge voltage of the IGBT with the current detecting terminal SE is provided for each of the IGBTs forming the main circuit 5. Since parts designated by other reference numerals are identical with or similar to those of FIG. 8, the description is abbreviated.

An operation of the surge voltage protective circuit shown in FIG. 9 will now be described. Since a minute current proportional to a load current flowing between a collector C and the emitter E is shunted to the current detecting terminal SE, a potential difference corresponding to the load current is produced between opposite ends of the shunt resistance 32. The comparator 33a compares a voltage of the junction of the current detecting terminal SE and the shunt resistance 32 based on the potential difference referred to above with a voltage of the DC comparison voltage source 33b. The latter voltage is usually set higher than the former voltage. However, when a magnitude of these voltage is reversed, namely, the former voltage (i.e., the voltage of the junction of the current detecting terminal SE and the shunt resistance 32) becomes higher than the latter voltage, the comparator 33a outputs from an output terminal Out a detection signal indicating that the load current is an overcurrent.

On the other hand, a surge voltage applied between the collector C and the emitter E of the IGBT 2U is divided by a sum of a parasitic capacity Ccg between the collector C and a gate G, a parasitic capacity between the gate G and the emitter E and a parasitic capacity Cgs between the gate G and the current detecting terminal SE such that comparatively high surge voltages are respectively applied between the gate G and the emitter E and between the gate G and the current detecting terminal SE. In case a surge voltage in which a potential of the gate G is higher than those of the emitter E and the current detecting terminal SE is applied, the surge voltage is escaped via the diode 30 and the capacitor 29 by setting the capacity of the capacitor 29 far higher than the parasitic capacity Ccg. Meanwhile, in case a minus surge voltage in which the potential of the gate G is lower than that of the emitter E is applied, the minus surge voltage is escaped through the diodes 35 and 34.

As a result, since an abnormal voltage rise or an abnormal voltage drop in a minus direction between the gate G and the emitter E and between the gate G and the current detecting terminal SE due to an application of the surge voltage is restrained, especially, not only reverse voltages induced between the gate G and the emitter E and between the gate G and the current detecting terminal SE upon an application of the above mentioned minus surge voltage are respectively restricted as small as a sum of forward voltage drops of the diodes 35 and 34 and the forward voltage drop of the diode 34 but reverse voltage between the opposite ends of the shunt resistance 32 connected to the input terminal of the comparator 33a is also restricted as small as the forward voltage drop of the diode 35, a breakdown of the IGBT 2U, the drive circuit 15, the overcurrent detecting circuit 33, etc. can be prevented positively. In addition, since the expensive Zener diodes are not required to be provided for the circuitry configuration, the protective circuit can be made inexpensive.

Meanwhile, in the circuits of the seventh aspect of FIG. 8 and the eighth aspect of FIG. 9, the capacitor 29 may act also as the capacitor 23 shown in FIGS. 3 to 6.

Figure 10:
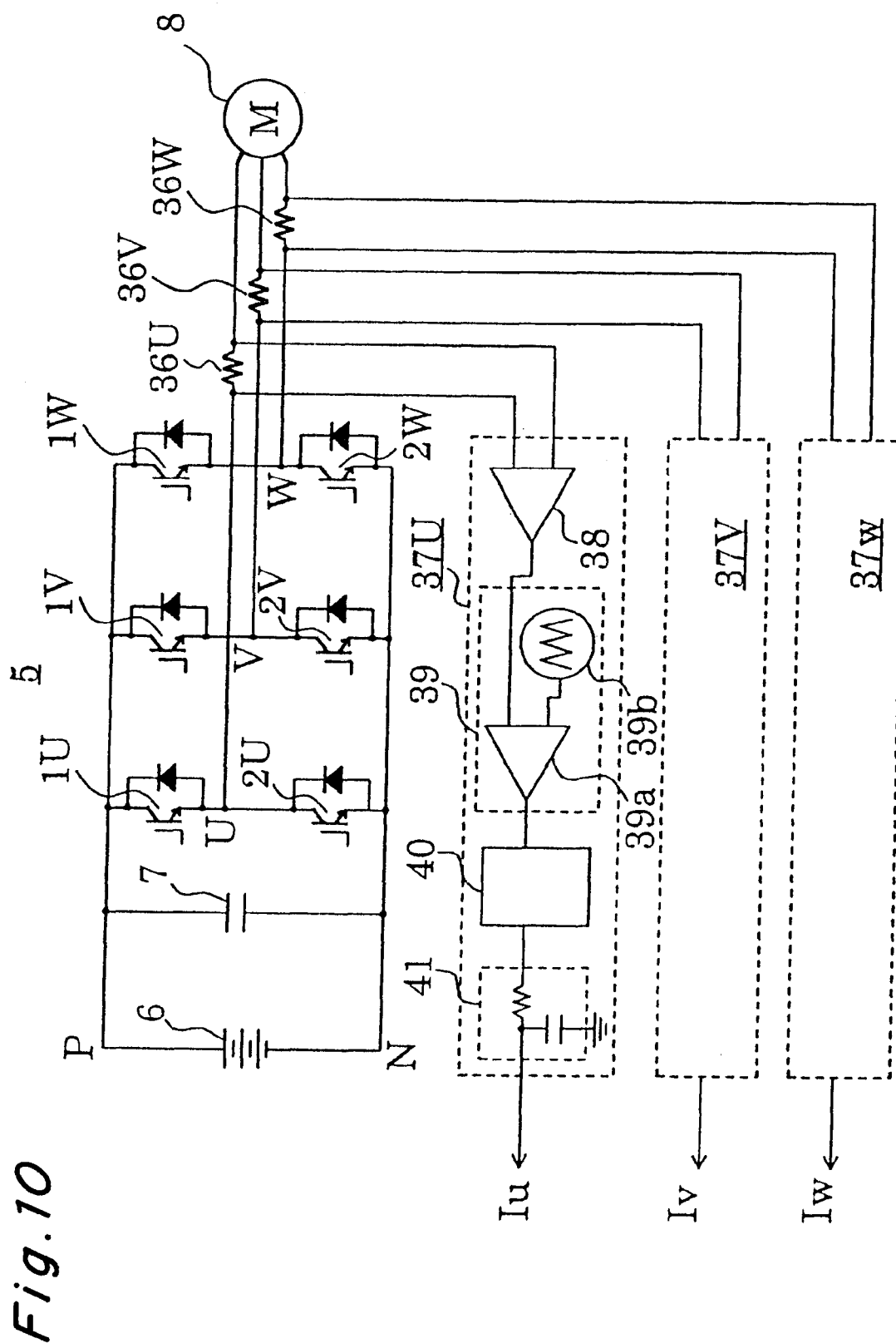
FIG. 10 is a block circuit diagram of an output current detecting circuit of an inverter according to a ninth aspect of the present invention.

FIG. 10 is a block circuit diagram of an output current detecting unit of an inverter according to a ninth aspect of the present invention. The output current detecting unit is adapted to be incorporated into the inverter circuits of the first to eighth aspects shown in FIGS. 1 to 9.

In FIG. 10, shunt resistances 36U, 36V and 36W are respectively inserted into U-phase, V-phase and W-phase output lines of the main circuit 5 so as to convert an output current into a voltage. Each of the current detectors 37U, 37V and 37W receives each of the voltage signals output by the shunt resistances 36U, 36V and 36W and outputs to its output side set relatively in a floating state, a detection signal of a load current of each phase. An amplifier 38 receives and amplifies the voltage signal output by the shunt resistance 36U.

A pulsing circuit 39 for converting an analog signal output by the amplifier 38, into a pulse signal subjected to PWM is formed by a comparator 39a and a triangular wave oscillation circuit 39b. In a level shift circuit 40, a reference potential of its input side is set in a floating state relative to that of its output side. To transmit the pulse signal from the input side to the output side, the level shift circuit 40 outputs the input pulse signal by shifting a level of a reference potential of the pulse signal. The level shift circuit 40 has a circuitry configuration substantially similar to that of the level shift circuit 19 shown in FIG. 1, except that its output circuit section is grounded and its input circuit section is set in a floating state.

A demodulation circuit 41 is formed by a low-pass filter (LPF) for demodulating a PWM signal input from the level shift circuit 40, into an analog signal. Since parts designated by other reference numerals are identical with or similar to those of FIGS. 1 to 7, the description thereof is omitted.

An operation of the output current detecting unit shown in FIG. 10 will now be described. The load current of each phase of the three-phase induction motor 8 acting as the load is converted by each of the shunt resistances 36U, 36V and 37W into the analog voltage signal corresponding to the load current. The analog voltage signal is amplified by the amplifier 38 so as to be input to the pulsing circuit 39 in which the analog voltage signal is converted into the pulse signal subjected to PWM. The level shift circuit 40 in which the reference potential of the input side is set in a floating state relative to that of the output side transmits the pulse signal from the input side to the output side. By passing the pulse signal through the demodulation circuit 41 formed by the LPF, the demodulation circuit 41 removes a high-frequency component from the pulse signal so as to output the analog signal indicative of a value of the load current.

In the above described configuration, the detection signal in a floating state relatively is transmitted to the output side of the level shift circuit 40 by the level shift circuit 40. However, since the level shift circuit 40 is not capable of transmitting the analog signal, the pulsing circuit 39 is provided upstream of the level shift circuit 40 so as to convert the analog detection signal into a digital signal optimized for minimization of the number of pulses per unit time, i.e., the pulse signal subjected to PWM. Therefore, it is possible to obtain the compact, highly accurate and highly reliable detecting unit having a long service life and low power consumption, in which the signal can be transmitted efficiently, a non-contact type current detecting element (not shown) is not required to be used for detecting the load current and a photocoupler (not shown) defective in practical length of its service life is not required to be used, so that the detecting unit can be incorporated into a package.

Meanwhile, for comparison with a current detecting circuit employing a Hall element or a current transformer as a background non-contact type current detecting element, the demodulation circuit 41 for demodulating the PWM signal into the analog signal is provided at a final stage. However, in case the PWM signal is applied, as a digital signal, to a microcomputer (not shown) acting as a PWM control unit, the demodulation circuit 41 is not required to be provided.

Meanwhile, in the first to ninth aspects of the present invention shown in FIGS. 1 to 10, the inverter for controlling drive of the induction motor or the like is provided as a power converter, for example. However, the power converter of the present invention is not limited to the inverter, but may also be applied to a drive control unit for a DC brushless motor or a switched reluctance (SR) motor so as to achieve similar effects. For example, the SR motor causes electric current to flow in one direction in coils of respective phases of its stator sequentially and IGBTs are used for energizing or deenergizing the coils of the respective coils of the stator. For example, in the case of a four-phase motor, four IGBTs (not shown) for phase changeover and drive control circuits (not shown) corresponding to the IGBTs, respectively are provided. By applying the present invention to these drive control circuits, the power converter for the SR motor can function stably for a long time.

Industrial Applicability

As described above, the power converter of the present invention is suitable for use as a power module for performing variable speed control of the induction motor, the DC brushless motor, the SR motor, etc. employed for drive control units of, for example, industrial machines, electric home appliances such as an air conditioner, a refrigerator, etc. and motor vehicles.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter comprising:
    a main circuit including:
        a plurality of semiconductor element rows each having a plurality of semiconductor elements connected to one another in series, said semiconductor element rows being connected, at opposite ends thereof, to one another in parallel, and at least one of the semiconductor elements in each of the semiconductor element rows being a switching semiconductor element,
        a DC main power source connected between junctions of the semiconductor element rows, and
        a load connected to a series junction of the semiconductor elements in each of the semiconductor element rows;
    a respective level shift circuit associated with each of the switching semiconductor elements, and configured to receive a control signal at an input side thereof and to shift, relative to a reference potential at the input side, a level of a reference potential at an output side of the level shift circuit so as to follow variations of a reference potential of the respective switching semiconductor element;
    a respective drive circuit configured to receive a signal from the respective level shift circuit and configured to output a drive control signal to the respective switching semiconductor element;
    a DC control power source having a negative pole connected to a point of the main circuit and configured to supply electric power to the input side of each respective level shift circuit; and
    at least one of a first inductor and a first resistance inserted between the point of the main circuit and the negative pole of the DC control power source,
    wherein electric power supplied from the DC main power source is converted into an alternating current or an on/off current in response to an input of the drive control signal so as to be supplied to the load.

2. A power converter according to claim 1, further comprising:
    a capacitor inserted between the negative pole of the DC control power source and a reference potential point of the output side of the respective level shift circuit.

3. A power converter according to claim 1, further comprising:
at least one of a second resistance and a second inductor inserted between a reference potential point of the output side of the respective level shift circuit and a negative main pole of the switching semiconductor element corresponding to the respective level shift circuit.

4. A power converter according to claim 1, further comprising:
a first capacitor inserted between positive and negative feeding points common with the respective drive circuit and the output side of the respective level shift circuit; and
a diode inserted between a positive pole of the DC control power source and a positive feeding point such that a cathode of the diode is connected to the capacitor.

5. A power converter according to claim 4, further comprising:
at least one of a second inductor and a second resistance inserted between an anode of the diode and the positive pole of the DC control power source so as to a form a series circuit with the diode; and
a second capacitor inserted between the point of the main circuit and the anode of the diode.

6. A power converter according to claim 1, wherein the switching semiconductor element comprises an insulated gate type transistor, and
wherein the power converter further comprises:
a gate voltage detecting circuit including a comparison voltage source configured to output a comparison voltage lower than a normal gate voltage of the transistor and higher than an abnormal gate voltage of the transistor, and including a comparator configured to compare a voltage of the insulated gate with the comparison voltage and to output an abnormality signal when the voltage of the insulated gate is lower than the comparison voltage.

7. A power converter according to claim 6, wherein there is a time lag between a first time point of input of the control signal to the respective drive circuit and a second time point of output of a normal signal by the gate voltage detecting circuit, and
wherein the power converter further comprises:
an abnormality signal invalidating circuit configured to output, during a predetermined period from the first time point to a third time point occurring at or after the second time point, the normal signal by invalidating the abnormality signal output by the gate voltage detecting circuit.

8. A power converter according to claim 1, wherein the switching semiconductor element comprises an insulated gate type transistor, and
wherein the power converter further comprises:
a capacitor inserted in parallel with the respective drive circuit of the transistor such that a negative pole of the capacitor is connected to a negative main pole of the transistor;
a first diode inserted between a junction of a positive feeding point of the respective drive circuit and the capacitor and the insulated gate such that an anode of the first diode is connected to the insulated gate; and
a second diode inserted between the insulated gate and the negative main pole such that a cathode of the second diode is connected to the insulated gate.

9. A power converter according to claim 1, wherein the switching semiconductor element comprises an insulated-gate transistor having a current detecting terminal provided in parallel with a negative main pole of the transistor, and
wherein the power converter further comprises:
a shunt resistance inserted between the current detecting terminal and the negative main pole of the transistor;
a DC comparison voltage source having a reference potential at the negative main pole of the transistor;
a comparator in which one of a pair of input terminals is connected to a junction of the shunt resistance and the current detecting terminal and the DC comparison voltage source is connected to the other of the input terminals, and said comparator being configured to compare a potential difference of the shunt resistance with a voltage of the DC comparison voltage source so as to output an overcurrent detecting signal of the insulated-gate transistor;
a capacitor inserted in parallel with the respective drive circuit of the insulated-gate transistor, between positive and negative feeding points of the respective drive circuit, with the negative feeding point being connected to the negative main pole of the transistor;
a first diode inserted between the positive feeding point and the insulated gate such that an anode of the first diode is connected to the insulated gate;
a second diode inserted between the insulated gate and the current detecting terminal such that a cathode of the second diode is connected to the insulated gate; and
a third diode inserted between the current detecting terminal and the negative main pole of the transistor such that a cathode of the third diode is connected to an anode of the second diode.

10. A power converter according to claim 1, further comprising:
a shunt resistance inserted into a respective output line connecting the main circuit and the load;
an amplifier configured to amplify a voltage drop of the shunt resistance;
a pulsing circuit configured to receive an output signal of the amplifier and to output a pulse signal subjected to pulse width modulation; and
another level shift circuit in which a reference potential at its input side is set in floating state relative to that at its output side, said another level shift circuit being configured to receive the pulse signal and to transmit the pulse signal from the input side to the output side by shifting a level of a reference potential of the pulse signal such that a load current is detected on the basis of an output signal of the another level shift circuit.

11. A power converter comprising:
a main circuit including:
a plurality of semiconductor element rows each having a plurality of semiconductor elements connected to one another in series, said semiconductor element rows being connected, at opposite ends thereof, to one another in parallel, and at least one of the semiconductor elements in each of the semiconductor element rows being a switching semiconductor element,
a DC main power source connected between junctions of the semiconductor element rows, and
a load connected to a series junction of the semiconductor elements in each of the semiconductor element rows;
a respective level shift circuit associated with each of the switching semiconductor elements, and configured to receive a control signal at an input side thereof and to shift, relative to a reference potential at the input side, a level of a reference potential at an output side of the level shift circuit so as to follow variations of a reference potential of the respective switching semiconductor element;

a respective drive circuit configured to receive a signal from the respective level shift circuit and configured to output a drive control signal to the respective switching semiconductor element;

a DC control power source having a negative pole connected to a point of the main circuit and configured to supply electric power to the input side of each respective level shift circuit; and a first capacitor inserted between the negative pole of the DC control power source and a reference potential point of the output side of the respective level shift circuit, wherein electric power supplied from the DC main power source is converted into an alternating current or an on/off current in response to an input of the drive control signal so as to be supplied to the load, and wherein the respective level shift circuit comprises a transistor having a negative pole connected to a negative pole of the DC control power source and to the reference potential at the input side of the level shift circuit, a gate configured to receive the control signal, and a positive pole configured to output, by shifting a level of the reference potential of the control signal input to the gate, the control signal to the respective drive circuit.

12. A power converter according to claim 11, further comprising:

at least one of a resistance and an inductor inserted between the reference potential point of the output side of the respective level shift circuit and a negative main pole of the switching semiconductor element corresponding to the respective level shift circuit.

13. A power converter according to claim 11, further comprising:

a second capacitor inserted between positive and negative feeding points common with the respective drive circuit and the output side of the respective level shift circuit;

a diode inserted between a positive pole of the DC control power source and a positive feeding point such that a cathode of the diode is connected to the capacitor; and at least one of an inductor and a resistance inserted between the point of the main circuit and the negative pole of the DC control power source.

14. A power converter comprising:

a main circuit including:
  a plurality of semiconductor element rows each having a plurality of semiconductor elements connected to one another in series, said semiconductor element rows being connected, at opposite ends thereof, to one another in parallel, and at least one of the semiconductor elements in each of the semiconductor element rows being a switching semiconductor element,
  a DC main power source connected between junctions of the semiconductor element rows, and
  a load connected to a series junction of the semiconductor elements in each of the semiconductor element rows;

a respective level shift circuit associated with each of the switching semiconductor elements, and configured to receive a control signal at an input side thereof and to shift, relative to a reference potential at the input side, a level of a reference potential at an output side of the level shift circuit so as to follow variations of a reference potential of the respective switching semiconductor element;

a DC control power source having a negative pole connected to a point of the main circuit and configured to supply electric power to the input side of each respective level shift circuit; and at least one of a second resistance and a second inductor inserted between a reference potential point of the output side of the respective level shift circuit and a negative main pole of the switching semiconductor element corresponding to the respective level shift circuit, wherein electric power supplied from the DC main power source is converted into an alternating current or an on/off current in response to an input of the drive control signal so as to be supplied to the load.

15. A power converter comprising:

a main circuit including:
  a plurality of semiconductor element rows each having a plurality of semiconductor elements connected to one another in series, said semiconductor element rows being connected, at opposite ends thereof, to one another in parallel, and at least one of the semiconductor elements in each of the semiconductor element rows being a switching semiconductor element,
  a DC main power source connected between junctions of the semiconductor element rows, and
  a load connected to a series junction of the semiconductor elements in each of the semiconductor element rows;

shifting means associated with each of the switching semiconductor elements and for receiving a control signal at an input side thereof and for shifting, relative to a reference potential at the input side, a level of a reference potential at an output side of the shifting means so as to follow variations of a reference potential of the respective switching semiconductor element;

driving means for receiving a signal from the respective level shift circuit and for outputting a drive control signal to the respective switching semiconductor element;

power source means having a negative pole connected to a point of the main circuit and for supplying electric power to the input side of each respective shifting means; and at least one of a first inductor and a first resistance inserted between the point of the main circuit and the negative pole of the power source means, wherein electric power supplied from the DC main power source is converted into an alternating current or an on/off current in response to an input of the drive control signal so as to be supplied to the load.

16. A power converter according to claim 15, further comprising:

a capacitor inserted between the negative pole of the power source means and a reference potential point of the output side of the respective shifting means.

17. A power converter according to claim 15, further comprising:

at least one of a second resistance and a second inductor inserted between a reference potential point of the output side of the respective shifting means and a negative main pole of the switching semiconductor element corresponding to the respective shifting means.

18. A power converter according to claim 15, further comprising:
a first capacitor inserted between positive and negative feeding points common with the respective driving means and the output side of the respective level shifting means; and
a diode inserted between a positive pole of the DC control power source and a positive feeding point such that a cathode of the diode is connected to the capacitor.

19. A power converter according to claim 18, further comprising:
at least one of a second inductor and a second resistance inserted between an anode of the diode and the positive pole of the power source means so as to a form a series circuit with the diode; and
a second capacitor inserted between the point of the main circuit and the anode of the diode.

20. A power converter according to claim 15, wherein the switching semiconductor element comprises an insulated gate type transistor, and
wherein the power converter further comprises:
a gate voltage detecting means including a means for outputting a comparison voltage lower than a normal gate voltage of the transistor and higher than an abnormal gate voltage of the transistor, and including a comparator means for comparing a voltage of the insulated gate with the comparison voltage and for outputting an abnormality signal when the voltage of the insulated gate is lower than the comparison voltage.

21. A power converter according to claim 20, wherein there is a time lag between a first time point of input of the control signal to the respective driving means and a second time point of output of a normal signal by the gate voltage detecting circuit, and
wherein the power converter further comprises:
an abnormality signal means for outputting, during a predetermined period from the first time point to a third time point occurring at or after the second time point, the normal signal by invalidating the abnormality signal output by the gate voltage detecting means.

22. A power converter according to claim 15, wherein the switching semiconductor element comprises an insulated gate type transistor, and
wherein the power converter further comprises:
a capacitor inserted in parallel with the respective driving means of the transistor such that a negative pole of the capacitor is connected to a negative main pole of the transistor;
a first diode inserted between a junction of a positive feeding point of the respective driving means and the capacitor and the insulated gate such that an anode of the first diode is connected to the insulated gate; and
a second diode inserted between the insulated gate and the negative main pole such that a cathode of the second diode is connected to the insulated gate.

23. A power converter according to claim 15, wherein the switching semiconductor element comprises an insulated-gate transistor having a current detecting terminal provided in parallel with a negative main pole of the transistor, and
wherein the power converter further comprises:
a shunt resistance inserted between the current detecting terminal and the negative main pole of the transistor;
a DC comparison voltage source having a reference potential at the negative main pole of the transistor;
a comparator means in which one of a pair of input terminals is connected to a junction of the shunt resistance and the current detecting terminal and the DC comparison voltage source is connected to the other of the input terminals, and said comparator means comparing a potential difference of the shunt resistance with a voltage of the DC comparison voltage source so as to output an overcurrent detecting signal of the insulated-gate transistor;
a capacitor inserted in parallel with the respective drive circuit of the insulated-gate transistor, between positive and negative feeding points of the respective drive circuit, with the negative feeding point being connected to the negative main pole of the transistor;
a first diode inserted between the positive feeding point and the insulated gate such that an anode of the first diode is connected to the insulated gate;
a second diode inserted between the insulated gate and the current detecting terminal such that a cathode of the second diode is connected to the insulated gate; and
a third diode inserted between the current detecting terminal and the negative main pole of the transistor such that a cathode of the third diode is connected to an anode of the second diode.

24. A power converter according to claim 15, further comprising:
a shunt resistance inserted into a respective output line connecting the main circuit and the load;
amplifier means for amplifying a voltage drop of the shunt resistance;
pulsing means for receiving an output signal of the amplifier means and for outputting a pulse signal subjected to pulse width modulation; and
another shifting means in which a reference potential at its input side is set in floating state relative to that at its output side, said another shifting means for receiving the pulse signal and for transmitting the pulse signal from the input side to the output side by shifting a level of a reference potential of the pulse signal such that a load current is detected on the basis of an output signal of the another shifting means.

* * * * *

UNITED STATES PATENT AND TRADEMARK OFFICE
CERTIFICATE OF CORRECTION

PATENT NO.     : 6,351,399 B2
DATED          : February 26, 2002
INVENTOR(S)    : Ken Takanashi et al.

It is certified that error appears in the above-identified patent and that said Letters Patent is hereby corrected as shown below:

Column 2,
Line 43, change "load" to -- gate --;
Line 45, change "Inv" to -- INv --.

Column 6,
Line 27, change "low-side" to -- the --.

Column 11,
Line 11, change "signal 19" to -- circuit 19 --.

Column 21,
Line 20, change "37W" to -- 36W --.

Column 23,
Line 22, delete "a" (first occurrence).

Column 26,
Line 44, change "level shift circuit" to -- shifting means --.

Column 27,
Line 8, delete "level";
Lines 10 and 11, change "DC control power source" to -- power source means --;
Line 38, change "circuit" to -- means --.

Column 28,
Lines 23 and 24, change "drive circuit" to -- driving means --;
Line 26, change "drive circuit" to -- driving means --.

Signed and Sealed this

Eighth Day of October, 2002

*Attest:*

*Attesting Officer*

JAMES E. ROGAN
*Director of the United States Patent and Trademark Office*